United States Patent
Schulz

(10) Patent No.: US 9,809,211 B2
(45) Date of Patent: Nov. 7, 2017

(54) THREE STAGE WATERCRAFT

(71) Applicant: Walter Schulz, New Bedford, MA (US)

(72) Inventor: Walter Schulz, New Bedford, MA (US)

( * ) Notice: Subject to any disclaimer, the term of this patent is extended or adjusted under 35 U.S.C. 154(b) by 0 days.

(21) Appl. No.: 15/632,096

(22) Filed: Jun. 23, 2017

(65) Prior Publication Data

US 2017/0291592 A1 Oct. 12, 2017

Related U.S. Application Data

(63) Continuation-in-part of application No. 15/080,509, filed on Mar. 24, 2016, now Pat. No. 9,688,356.

(60) Provisional application No. 62/137,720, filed on Mar. 24, 2015.

(51) Int. Cl.
| | |
|---|---|
| B63B 1/24 | (2006.01) |
| B60V 1/22 | (2006.01) |
| B63H 7/02 | (2006.01) |
| B63B 1/26 | (2006.01) |
| B63B 1/32 | (2006.01) |
| B60V 1/14 | (2006.01) |

(52) U.S. Cl.
CPC ............ *B60V 1/22* (2013.01); *B60V 1/14* (2013.01); *B63B 1/248* (2013.01); *B63B 1/26* (2013.01); *B63B 1/322* (2013.01); *B63H 7/02* (2013.01); *B63B 2759/00* (2013.01)

(58) Field of Classification Search
CPC ........... B63B 1/248; B63B 1/26; B63B 1/322; B63H 7/02; B60V 1/14; B60V 1/22
See application file for complete search history.

(56) References Cited

U.S. PATENT DOCUMENTS

| | | |
|---|---|---|
| 1,389,865 A | 9/1921 | Fox |
| 3,157,146 A | 11/1964 | Billig |
| 4,005,667 A | 2/1977 | Staba |
| 4,080,922 A | 3/1978 | Brubaker |
| 5,105,898 A | 4/1992 | Bixel |
| 5,460,098 A | 10/1995 | Jackson et al. |
| 6,325,011 B1 | 12/2001 | Klem |
| 6,994,049 B1 | 2/2006 | Schulz |
| 7,225,752 B2 | 6/2007 | Schulz |
| 2001/0045492 A1 | 11/2001 | Lewis |

OTHER PUBLICATIONS

International Search Report dated Jul. 4, 2016 for corresponding PCT Application No. PCT/US2016/024122, filed on Mar. 24, 2016.

*Primary Examiner* — Stephen P Avila
(74) *Attorney, Agent, or Firm* — McInnes & McLane, LLP

(57) ABSTRACT

A three stage watercraft for operation in the water as a traditional boat at low speeds in stage one, for operation on the water's surface at mid-range speeds at stage two, and for traveling in ground effect at higher range speeds is disclosed. The three stage craft includes a hydro-wing 12, at least a single hydrofoil 13 to aid with lift from stage one to stage two, and a pair of outboard floats or hydro-floats 16a, 16b supported by the hydro-wing 12, which are also designed to aid with lift from stage one to stage two. A gyration rotor 14 to aid with lift from stage one to stage two may also be provided as may a pair of pivotally mounted air propellers which aid in lift and propulsion by varying their operational angle relative to the plane of travel of the craft.

20 Claims, 28 Drawing Sheets

THREE STAGE WATERCRAFT

CROSS-REFERENCE TO RELATED APPLICATIONS

This application is a continuation-in-part of patent application Ser. No. 15/080,509, filed Mar. 24, 2016 and claims the benefit of priority to U.S. Provisional Patent Application No. 62/137,720, filed Mar. 24, 2015 and entitled "Three Stage Watercraft," the entire contents of the prior applications being incorporated herein by reference in their entirety.

TECHNICAL FIELD

The invention relates generally to a watercraft that can operate in three stages, more specifically to a watercraft that makes use of ground-effect in a high fuel-efficient watercraft that can travel as a boat in the water at low speeds, skim across the water on floats to achieve higher speeds and in ground effect at still higher speeds, which can maneuver effectively as it travels, and provide a relatively smooth ride during operation.

BACKGROUND

In fixed-wing aircraft, ground effect is generated by an aircraft's wings when they are close to a solid, fixed surface that results in increased lift and decreased drag and which requires very little thrust (forward horsepower). Ground effect increases air pressure on the lower wing creating a "ram" or "cushion" effect which greatly improves the lift to drag ratios by up to 250%. By reducing the drag coefficients, the thrust or energy expended to maintain speed is also greatly reduced. Every aircraft from jumbo jet airliners to small Piper Cubs, experience ground effect, which is especially noticeable when landing, as the aircraft momentarily "floats" above the runway. When taking off, ground effect may temporarily reduce the stall speed. The pilot can then fly level just above the runway while the aircraft accelerates in ground effect until a safe climb speed is reached.

In addition to traditional aircraft, wing-in-ground (WIG) watercraft that use ground effect to fly above water are also known in the art. WIG craft are used primarily over water due to the relatively constant surface of water that is free of obstacles. Generally, such watercraft have large fixed wings, about 1½ times greater than the height of ground effect in which they fly, the ground effect extending approximately 10-30 feet above the surface of the water. WIG craft largely travel at very high speeds, above approximately 50 mph, and as high as 100 mph or greater, which is achieved by using small engines. They also include a fuselage or hull that travels in the water when not in ground effect. WIG watercraft are desirable, particularly as transport vehicles, because they are more fuel-efficient than conventional watercraft, utilize small engines and are capable of travel at high speeds which can reach over 100 mph, thus covering large distances quickly.

A hydrofoil is a lifting surface, or foil, that generally operates in water. Hydrofoils are similar in appearance and purpose to airfoils, which are used by airplanes. As a watercraft using hydrofoils gains speed, low pressure is developed above the foil and high pressure is developed below the foil creating lift. When used as a lifting element on a hydrofoil craft, this upward force lifts the body or hull of the craft, decreasing drag and increasing speed.

There are two basic types of hydrofoils; "surface piercing" where the foil comes out of the craft and enters the water, usually at an angle so as the craft lifts there is less foil in the water, thus reducing drag as speed increases; and "submerged foils" that are completely underwater either fixed or dropped over the side of the craft. Submerged foils are not self-stabilizing, so they are continuously tilted to gain lift from the angle, similar to tilting an airplane nose up or down to change the angle of attack of the wings.

With either submerged or piercing foils if the sea state or waves are higher than the depth of the foils, then the bottom of the craft crashes into the waves, causing the craft to slow down and the foil lift speeds to decrease. A high speed hydrofoil shape must always have water flowing over and under the foil to work or create lift. Another problem associated with either submerged or piercing foils hydrofoils is "sonic cavitation". Because water is 700 times more molecular dense than air, once a hydrofoil reaches speeds much over 60 mph molecular "bubbles" from the top and bottom of the foil crashing into each other at the trailing edge of the foil causing cavitation. Similar to a separation bubbles in air, cavitation largely increases drag and often also reduces lift, thus resulting in loss of speed. Additionally, the collapse of larger vapor bubbles has been found to lead to vibrations and even structural damage. Damage due to cavitation often is a problem for marine propellers, turbines and pumps.

As a result of these shortcomings, it appears that the speed "wall" for hydrofoils is around 60-70 mph and conventional hydrofoils generally cannot handle seas above about 6-12 feet. Thus, hydrofoils have experienced very limited commercial application and success.

First developed in 1923, gyrocopters or gyroplanes are wingless aircraft, similar in look to a helicopter, which use auto gyration, i.e. free spinning, non-powered rotors, to obtain lift. Auto gyration occurs when air is passed under a rotor blade causing the blades to spin which then provides lift, while an engine turning a conventional airplane propeller creates forward motion or thrust. Pitch control is achieved by tilting the rotor fore and aft; roll control by tilting the rotor laterally (side to side). A gyrocopter cannot lift straight up or hover like a helicopter, and requires a relatively short runway for takeoff and landing. One reason that gyrocopters did not gain mass appeal is their lack of speed. The physics that create auto gyration also impedes speeds much above 120 knots due to the lift/drag ratios of the rotors. By 1939, the gyrocopter concept was largely discarded because aircraft manufacturers for military and civilian use were hoping to achieve speeds well in excess of 300 knots for propeller driven aircraft.

SUMMARY

There exists a need for a transport craft capable of traveling at a variety of speeds over water for use as a transport vehicle, which can do so in a fuel-efficient and safe manner.

While conventional WIG watercrafts have found use as military and transport vehicles, they are not optimally suited for use in a variety of circumstances, and require specially trained personnel to operate them. For example, such craft are limited to areas where speed restrictions are above about 50 mph and where they have sufficient space to reach 10-30 feet above the water's surface while travelling at such high speeds. They do not effectively travel at lower speeds of below about 50 mph because the lift and drag components necessary to maintain ground effect in conventional WIG craft require thrust/lift ratios that translate into high speed operation. Additionally, because conventional WIG craft turn by banking, i.e. tipping their wings like an aircraft as they travel approximately 10-30 feet above the water, tight, emergency or avoidance turns are generally precluded. Because of the length of the wing and the low altitude at which they travel above the water, if emergency turns are attempted they often result in the wing of the craft contacting the water. As will be appreciated, if the wing of a craft traveling at between 50-100 mph is tipped and strikes the water, the result is an almost certain crash, as the craft will likely cartwheel out of control upon impact of the wing with the water. Due to both the high speed of travel and the inability of conventional WIG craft to execute tight, emergency turns, traveling across a crowed harbor, bay or river is not feasible with such craft as they pose a safety risk to the occupants and other watercraft. With conventional WIG craft it is important that they do not exceed maximum ground effect altitude due to the design and shape of the wing, which does not provide safe lift above ground effect vertical limitations.

In addition to the foregoing, when they are not flying a ground effect WIG craft become poor boats, as they are typically only capable of travel at approximately 5 to 10 mph. The missing speed "gap" between 10 mph (the upper limit for a WIG craft as a boat) and 50 mph (the lower limit of a WIG craft in ground effect) severely inhibits WIG crafts' utility. The majority of conventional WIG crafts are still using outdated and inefficient amphibious airplane fuselages with large wing designs attached that have not evolved appreciably since World War II, in order to fly in ground effect. In order to breach the water's surface, these craft need approximately 4x-5x thrust in calm waters to break free of the surface. WIG crafts are also forced to take off into the wind, like a conventional amphibious airplane, which affects ability in limited waterway space and rough sea state conditions.

Unlike conventional WIG crafts, the three-stage watercraft, or Amphfoil™ craft described herein, in a first embodiment includes hydrofoils to obtain lift to move from a first, low speed stage (Stage One) into a second, mid-speed stage (Stage Two); a "hydro-wing" hull that incorporates both the hull and the wings in a continuous design instead of an airplane type fuselage with distinct wings; and "hydro-floats". The hydrofoils are of the "surface piercing" variety, but unlike traditional hydrofoils are utilized only in lower (or mid) speeds, and not for high speed applications, thus avoiding the shortcomings inherent in prior art hydrofoils when utilized at high speeds. In other embodiments, the Amphfoil™ craft includes a powered and unpowered spinning rotor to obtain lift. The hydro-wing provides more uninterrupted bottom wing surface for improved ground effect performance (no fuselage drag) and enables the beam, i.e. width of the craft to be reduced compared to existing ground effect craft.

The hydro-floats have a low drag, high lift reverse deadrise design that eliminates drag inducing "chines," or flat lifting surfaces, to reduce the amount of thrust needed to breach the water surface when moving out of stage one, as described below. Deadrise is the angle formed between a static waterline and the hull centerline (of a watercraft). The hydro-floats include a reverse deadrise similar in form and effect to a boat hull having a twist in underwater shape as measured relative to a static waterline, as described in applicant's previous U.S. Pat. Nos. 6,994,049 and 7,225,752 to Walter Schulz, which are incorporated herein in their entirety. The reverse deadrise effect provides a vortex effect, or positive turbulence in the water to create lift without having to rely on high amounts of increased thrust.

The Amphfoil™ craft may also include an articulating trim arm, or ATA, supported on each hydro-float, the ATA remaining in contact with the water while the Amphfoil craft travels in ground effect to maintain the craft in ground effect and to keep the status of the craft as a boat. The hydro-wing hull and hydro-float design results in an advance for WIG crafts in terms of addressing the negative efficiency issues of drag.

The combination of the hydrofoils (or alternatively, the gyration rotor), the hydro-wing hull and hydro-floats provide for an improved WIG craft that has enhanced performance when traveling both in the water, transitioning out of the water, and traveling in ground effect. The design of the Amphfoil™ craft of the present application allows for a unique three-stage speed design concept to create a watercraft that is capable of never before achieved combination of safety, speed, fuel economy (as high as 15 mpg), and range, as well as a smooth ride at various stages of travel over the water. As used herein, the three stages are defined as follows:

Stage One—Amphfoil™ craft traveling in water as a boat with the hydro-wing in the water, for example, when docking and refueling, generally at speeds of approximately 0-10 mph;

Stage Two—Amphfoil™ craft traveling above water, i.e. when the hydro-wing is lifted out of contact with the water by either the hydrofoils providing lift, or the gyro rotors under power. The hydro-floats remain in contact with the water's surface so that the Amphfoil™ craft may travel and maneuver safely across crowded waterways, generally at speeds of approximately 10-30 mph;

Stage Three—Amphfoil™ craft traveling in full ground effect, generally with only the ATA in contact with the water (hydrofoils and/or hydro-floats generally being out of contact) for traveling in open waters when boat traffic and obstacles are at a minimum, mostly at speeds of approximately 30-100 mph or greater. If utilizing gyro rotors instead of hydrofoils, the gyro rotors may be folded back, or otherwise made non-operational to reduce rotational and blade drag in Stage three, as speeds of 200 mph or greater may be seen.

Although speeds are given for the above stages, these are approximations and the actual speeds may vary.

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE ILLUSTRATIVE EMBODIMENTS

Figure 1:
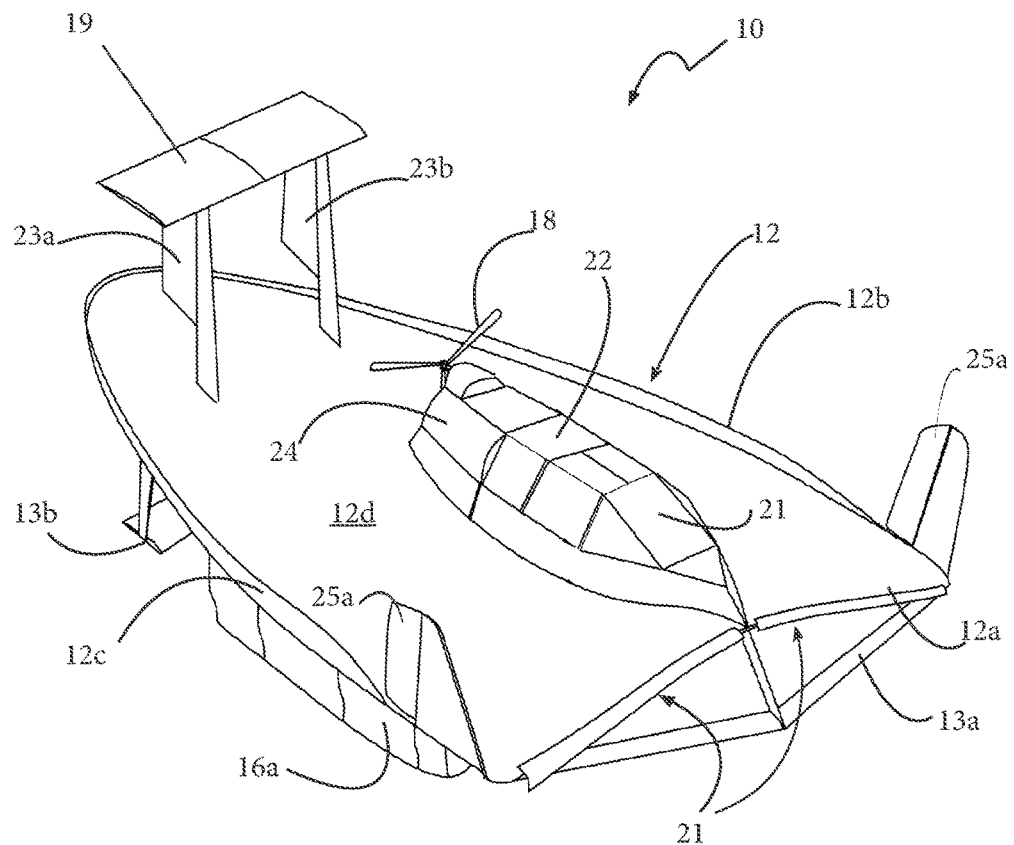
FIG. 1 is a front perspective view of a first exemplary embodiment of the three stage watercraft of the present application.
Figure 2:
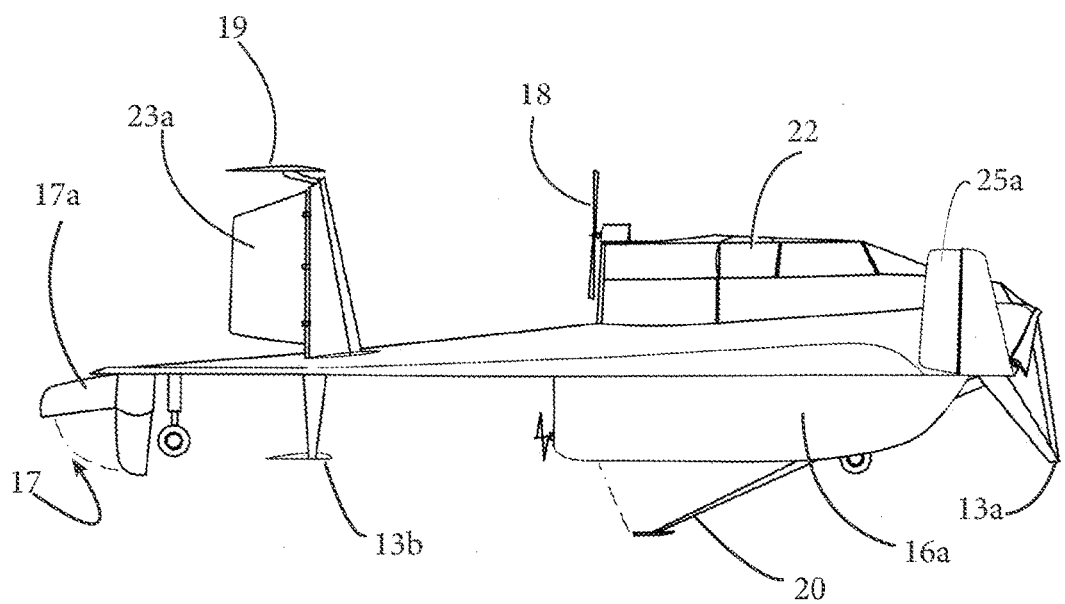
FIG. 2 is a side elevational view of the three stage watercraft of FIG. 1.

The phraseology and terminology used herein is for the purpose of description and should not be regarded as limiting. Any references to examples, embodiments, components, elements or devices described herein referred to in the singular may also embrace embodiments including a plurality, and any references in plural to any embodiment, component, element or device herein may also embrace embodiments including only a singularity. References in the singular or plural form are not intended to limit the presently disclosed device, its components, structure, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As used herein with respect to the three-stage operation of the Amphfoil™ craft, stage one refers to in-water use of the Amphfoil™ craft, i.e. as a boat with the hydro-wing in the water, which is used during docking and refueling of the Amphfoil™ craft (speeds of approximately 0 to 10 mph); stage two refers to speeds during which the hydro-wing is lifted relative to the water (spaced above it), traveling and maneuvering across crowded water ways with hydrofoils and hydro-floats in contact with the water, for example "skimming" on top of it (speeds of approximately 10 to 30 mph); and stage three refers to speeds where the Amphfoil™ craft travels in fully functional ground effect above the water, generally with only the ATA in contact with the water (hydrofoils and/or hydro-floats generally being out of contact) or any solid surface, as the Amphfoil™ craft maneuvers across open waters when boat traffic and obstacles are at a minimum (speeds of approximately 30 to 100 mph and possibly higher). As will be appreciated, the speeds associated with each stage are approximations and may vary from the speeds disclosed herein.

Referring initially to FIGS. 1-4, a first embodiment of Amphfoil™ craft 10 for three-stage operation is illustrated. The Amphfoil™ craft 10 includes a body or hydro-wing 12 that includes both a hull 12a and wings 12b and 12c, at least a single hydrofoil to aid with lift from stage one to stage two, and a pair of outboard floats or hydro-floats 16a, 16b supported by the hydro-wing 12, which are also designed to aid with lift from stage one to stage two. A pair of aft air rudders 23a, 23b may be provided, which aid in turning and steering, as may be a rotational air propeller 18, supported by the hydro-wing 12, which also helps effectuate turning (instead of just banking) and forward thrust. In addition, the Amphfoil™ craft may include at least one water rudder 17 (FIG. 2) supported by the hull 12a for in-water turning purposes, and an articulating trim arm or ATA for elevator control 20 (FIG. 2) supported by the hydro-wing 12, the ATA 20 remaining in contact with the water during stage three operation for ease of handling, as described in greater detail herein below.

Figure 3:
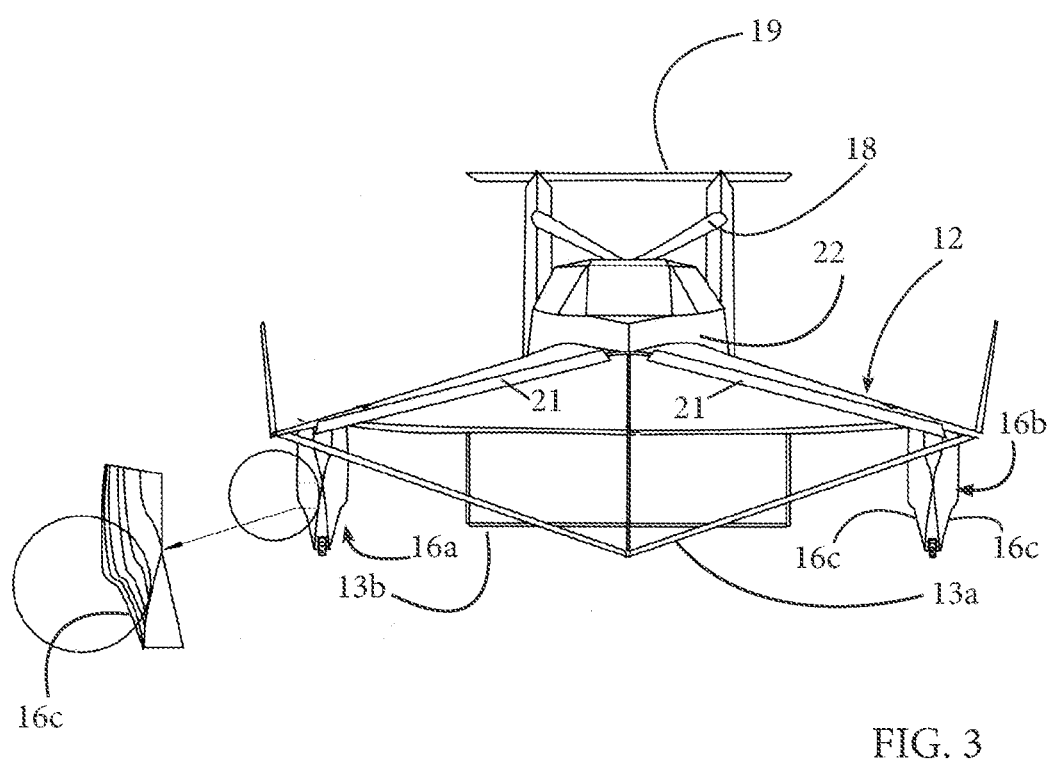
FIG. 3 is a front elevational view of the three stage watercraft of FIG. 1.
Figure 4:
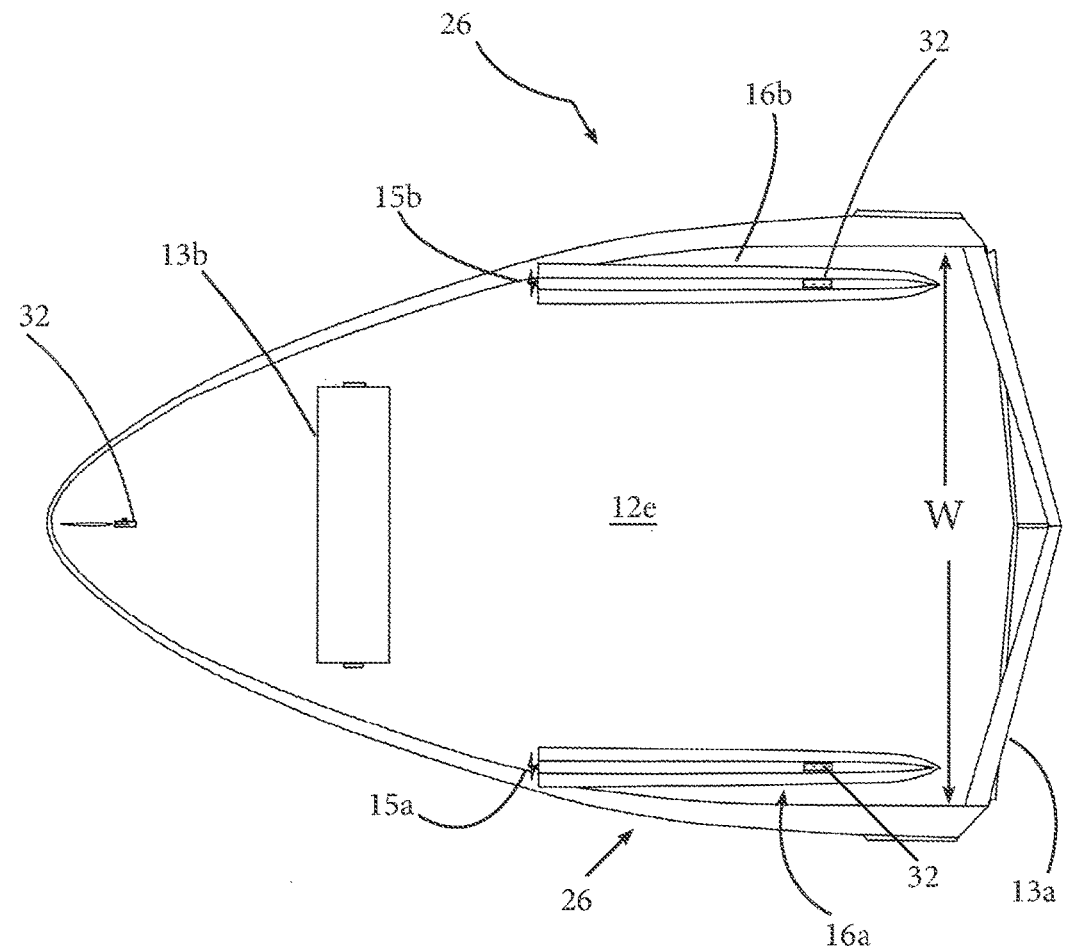
FIG. 4 is a bottom plan view of the three stage watercraft of FIG. 1.

Referring now to FIGS. 1, 3 and 4, the hydro-wing 12 incorporates both the hull 12a and wings 12b and 12c into a continuous design having a top surface 12d that can support a cabin 22 for passengers, cockpit 21 and enclosed machinery 24, and a bottom surface 12e for supporting hydrofoils 13a, 13b, at least a portion of which contacts the water during stage one. The continuous shape of the hydro-wing design provides an uninterrupted bottom wing surface 12e for improved ground effect performance, as the entire bottom of the hydro-wing 12 essentially becomes a maximum ground effect wing. In contrast, prior art craft included a fuselage with attached wings jutting from the sides, thus resulting in fuselage drag during use and requiring a greater width of the craft.

The engines can be remotely mounted behind the cabin 22, or elsewhere, and may be contained in insulated compartments, as would be known in the art. The positioning of the engines, cabin 22 and cockpit 21 should be done to create proper balance in the Amphfoil™ craft based upon the anticipated weight. To reduce the infrared heat signature for military use, the engine compartment walls can be cooled using water jackets piped around the compartment. For larger Amphfoil™ crafts (above about 35 ft in length) twin auto/truck engines, either gasoline or diesel, which are liquid cooled using radiators may be used to keep engine noise levels below 85 decibels. Alternatively, other types of engines may be utilized. For example, for smaller crafts a single liquid cooled gasoline or diesel engine may be used to create power to the rotors and float propulsion. A second engine can also be incorporated for redundancy. Power from the engines to the rotors and float propulsion can be accomplished by hydraulics, link belts, electric motors or rod/transfer cases depending on the application, as would be known to one of skill in the art.

The hydro-wing 12 also enables the beam or width "w" to be reduced compared to prior-art ground effect craft, which is beneficial for docking and maneuvering in close quarters, and includes a low profile that, along with the hydro-floats 16a, 16b described below, provides excellent directional stability and crosswind handling. As best illustrated in FIG. 3, the hydro-wing 12 has a curved, arcuate shape, angling upward from the edge "e" of the wings 12b, 12c toward the center "c" of the hull 12a. While the hydro-wing may have a variety of dimensions, depending upon the application, it is expected that hydro-wing will be from about 20-60 feet long and about 14-42 feet wide.

The hydro-wing 12 may be constructed of carbon fiber, Kevlar™ and foam so that no additional floatation is needed, unlike prior-art WIG craft. Leading edge wing slats 21, for example the Flieseler Storch type, may be provided on the leading edge of the hydro-wing 12 to direct air upward over the hydro-wing, especially in low speed applications to increase lift on the top surface 12d of the hydro-wing. Supported outboard on the bottom surface 12e of the hydro-wing 12 are the hydro-floats 16a, 16b. The hydro-floats 16a, 16b not only provide floatation and wing stability when in non-ground effect speeds, but allow the Amphfoil™ craft to travel smoothly and efficiently in the water at lower speeds of approximately 10 to 30 mph (stage two speeds) by skiing or skimming across top of water with both the hydro-wing 12 and the hydrofoils 13a, 13b providing lift.

The hydro-floats 16a, 16b include a body designed to provide high lift and low drag as compared to conventional floats by incorporating the reverse-deadrise principle, as detailed herein above. As best shown in FIG. 3, the floats are provided with concavities 16c that create a vortex effect, or positive turbulence as water passes thereby, to aid in creating lift in order to move the hydro-wing from stage one to stage two. Propulsion systems 26 may also be provided that are preferably supported on the rear or within the hydrofloats 16a, 16b. Depending on the size and purpose of the craft and the resulting propulsion needed, the propulsion systems may include conventional boat type propellers 15a, 15b as shown in FIG. 4 (which may be fixed or folding) or alternately can utilize a hydraulic kort nozzle, jet type drive, as would be known to those of skill in the art. Bow thruster technology, as also known in the art, may instead be used on the hydrofloats 16a, 16b in order to decrease drag and vulnerability to damage associated with propellers. Thrusters may be mounted rearward and inserted within the hydrofloats, to allow for more maneuverability, especially in reverse, and would additionally help protect marine mammals by avoiding the possibility of propeller strikes. For ease of operation, the propulsion systems 26 may be operated by a single lever control, i.e. one handle for forward, reverse and throttle for each float drive.

In addition to the foregoing, rudders 17a, 17b (FIG. 2) may be supported at the rear of the hydro-wing 12 for in-water use. The rudders 17a, 17b may swing or flip-upward when not in the water. The rudders 17a, 17b are similar in design to those found on conventional boats, are operatively connected to aft air rudders 23a, 23b supported on the hull 12a, and are sized according to the size of the hydro-wing hull 12a. When the Amphfoil™ craft is traveling in stage one and two with the hydrofloats 16a, 16b in, or in contact with the water, the rudders 17a, 17b allow for tight turning, and can swing up when the Amphfoil™ craft is 5' to 15' above the water surface in full ground effect mode during stage three (where the hydrofloats 16a, 16b are no longer in contact with the water). Forward air rudders 25a, 25b may also be provided in addition to the aft air rudders 23a, 23b, if desired, in order to provide steering to enable turning during operation in both stage two and stage three. The air rudders 23a, 23b and 25a, 25b allow the Amphfoil™ craft to turn virtually without banking, providing for tight turning even in stage three.

Unlike existing ground effect WIG craft that must bank or tip the wings to turn (similar to an airplane), which takes a considerable distance to turn, and which risks a wing hitting the water, the Amphfoil™ craft uses a unique turning and steering system. The turning and steering system on the Amphfoil™ craft has all maneuverability and turning radius found in conventional powerboats when the Amphfoil™ craft is operating in stage one and two. The steering system 27 includes a dual-steering mechanism having a steering device, such as a steering wheel, knob, or joystick, operatively connected to a rear, horizontal elevator 19, and also includes the dual rudders 17a, 17b, which may be operatively attached to the aft air rudders 23a, 23b supported by the hull 12a, and forward air rudders 25a, 25b.

The ability of the Amphfoil™ craft to handle like a conventional twin-engine powerboat at speeds below 10 mph is due largely to the design of the low profile hydro-wing 12 in combination with the twin hydrofloats 16a, 16b that provide improved directional stability and crosswind handling as well as improved lift, as described above. In order to provide additional lift in moving the Amphfoil™ craft from stage one to stage two, hydrofoils 13a, 13b are also provided.

Hydrofoils 13a, 13b are used in the present embodiment to provide lift in stage one and stage two, prior to ground effect lifting the Amphfoil™ craft out of the water in stage three. Because stage three can occur at speeds of about 30 mph, but generally no greater than 50 mph, the hydrofoils 13a, 13b operate at "low speed". Thus, the low-speed hydrofoils 13a, 13b don't have the disadvantages associated with conventional hydrofoils that are utilized at high speeds, as described herein above. A pair of hydrofoils 13a, and 13b may be provided including a forward hydrofoil 13a, supported by the forward portion of the hydro-wing, and an aft hydrofoil supported by the underside of the hydro-wing, toward the aft portion. In the present embodiment, the forward hydrofoil 13a may have a generally V-Shaped member and may be hinged in order to swing, or flip upward toward the rear, and under the hydrofoil. The aft hydrofoil 13b may have a generally rectangular shape and may also be hinged to flip up, as desired. Hinging the hydrofoils 13a, 13b allows the hydrofoils to be positioned under the hydro-wing hull when having the hydrofoils down would be undesirable, such as when beaching the craft, or when flying in ground effect. When flying in ground effect, positioning the hydrofoils 13a, 13b in this manner prevents "tripping" on the hydrofoils if the craft gets too close to the water unintentionally. This provides protection to the hydrofoils 13a, 13b from dynamic loads on the foils, which could result in damage if the Amphfoil™ craft comes unexpectedly out of ground effect and re-enters the water at high speeds. The hydrofoils 13a, 13b can be swung back down into operation when moving from stage three to stage two once the water is taken up by the hydro-floats to slow the craft down. A hydraulic ram may be used for moving the hydrofoils 13a, 13b between the in-use or extended position where the hydrofoils contact the water, and the second or stored position where the hydrofoils 13a, 13b are positioned under the hydro-wing hull.

The hydrofoils 13a, 13b may also be moved into the stored position for "beaching", i.e. where the Amphfoil™ craft is run up onto land at fairly high speeds, as needed. For such situations, the craft also includes wheels, i.e. tires 32 for use when beaching in sand or gravel or on boat ramps. The type of tires and the tire tread design is determined by specific use. The Amphfoil™ craft's rear set of tires is attached to the water rudders 17a, 17b, and the craft is steered when out of the water by the steering wheel, knob or joystick, as described above. Foot pedals similar to conventional aircraft may control the rudders 17a, 17b and ground wheels 32 on the craft. Aircraft-type toe brakes on the rudder pedals controlling the brakes on the wheels, as known in the art, may also be used for stopping and sharp turns.

As will be appreciated, the hydrofoils 13a, 13b provide lift and create stage two speeds which have been previously unattainable, and are utilized with the Amphfoil™ craft when boat traffic, buoys and other obstacles are found. In order to effectively keep the Amphfoil™ craft at stage two, between approximately 10 to 30 mph, several operating parameters are utilized, including adjusting engine power, engaging the hydrofoils 13a, 13b, and adjusting the horizontal elevator 19 by the knob, steering wheel or joystick. At stage two speeds, the Amphfoil™ craft is expected to draw only inches of water minimizing drag, increasing fuel efficiency and lengthening range of travel with no wake turbulance.

The Amphfoil™ craft also incorporates a pair of articulating trim arms, or "ATA" 20, which are located below the hydro-wing 12 and that are designed to remain in contact with the water in stage two and stage three speeds. Each ATA 20 is also operatively connected to the horizontal elevator 19 by cables or the like, in order to ease captain workload and provide proper float elevation and hull trim at all times. When in ground effect, the position of the ATA 20 will automatically adjust the elevator 19 trim to raise or lower the hydro-wing, as needed, to maintain ground effect through the cable. In use the length of cable will slacken or tighten depending upon the position of the ATA thus causing the adjustment in the elevator 19 trim. While electronic controls can also be used for float and hull elevations, the ATA 20 are also provided to ensure that the Amphfoil™ craft remains a watercraft, meaning that it remains in contact with the water at all times.

The Amphfoil™ craft as disclosed herein provides for a smooth ride compared to other boats and WIG craft because of the unique hydro-wing design and hydrofoil lift. Since most of the world's population suffer from some degree of motion sickness providing a smooth ride to reduce seasickness, especially in rough waters is an advantage. Compounding motion sickness there is also body pounding issues found in boats in moderate to heavy seas including beach surf. Even elite units like the US Navy's Seal Team people are not immune to motion sickness and body pounding. The average Seal Team solider loses one inch of height over a full tour of duty due to spinal compression from pounding in small boats.

Figure 5A:
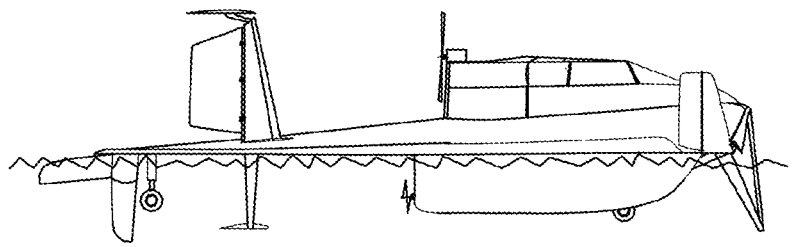
FIG. 5a is a schematic drawing of the three stage watercraft of FIG. 1 traveling in Stage One.
Figure 5B:
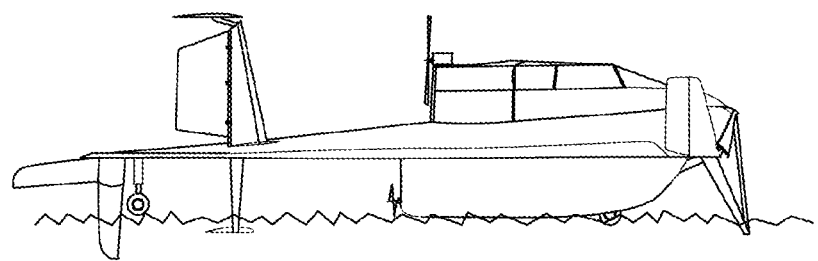
FIG. 5b is a schematic drawing of the three stage watercraft of FIG. 1 traveling in Stage Two.
Figure 5C:
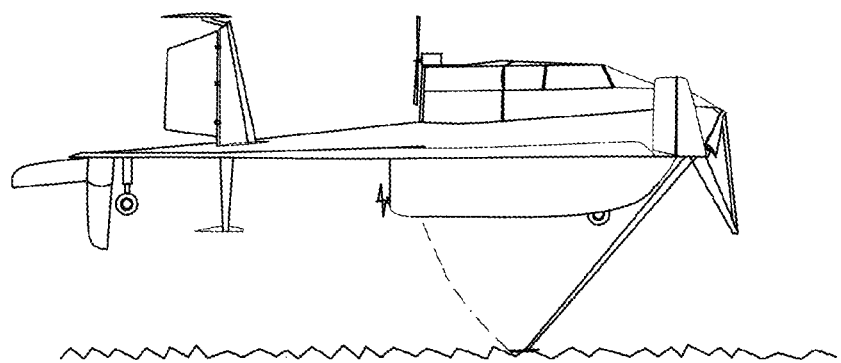
FIG. 5c is a schematic drawing of the three stage watercraft of FIG. 1 traveling in Stage Three.

Operation of the Amphfoil™ craft in stage one, stage two and stage three will now be described with reference to FIGS. 5a to 5c.

In stage one, the Amphfoil™ craft handles like a conventional twin engine power boat at speeds below about 10 mph., for example during docking and refueling of the Amphfoil™ craft. During this stage the hydrofloats 16a, 16b remain submerged, propulsion is achieved with single lever (one handle for forward, reverse and throttle) control for each hydrofloat drive (i.e. propeller or otherwise), and the water rudder 17 is likewise submerged and utilized for tight turning. The hydrofoils 13a, 13b are positioned under the water in stage one. As speed of the Amphfoil™ craft increases above about 10 mph, the low speed hydrofoils 13a, 13b provide the necessary lift to achieve stage two.

During stage two the Amphfoil™ craft is lifted relative to the water by the hydrofoils 13a, 13b such that the hydro-wing is raised above the water's surface while the hydrofloats 16a, 16b and hydrofoils 13a, 13b remain in contact with the water's surface as they travel across the top of it (i.e. "water-ski"). In stage two the ATA 20 is also in contact with the water as the hydro-wing 12 is raised above the surface of the water. As detailed above, the Amphfoil™ craft is kept at stage two by adjusting engine power, speed and the horizontal elevator. The air rudders 23a, 23b and water rudders 17a, 17b as disclosed herein above achieve turning of the craft in stage two. Stage two allows the Amphfoil™ craft to travel at faster speeds of about 10-30 mph while maneuvering safely across crowded waterways. Above about 30 mph the craft enters stage three.

Stage three operation of the Amphfoil™ craft is fully functional ground effect mode where the hydro-wing 12, hydrofoils 13a, 13b and hydrofloats 16a, 16b are all above the water, or any solid surface while the ATA 20 remains in contact with the surface. In stage three the Amphfoil™ craft also turns using air rudders 23a, 23b, and steering rudders 25a, 25b instead of banking like an aircraft, as with the prior WIG craft. The ATA remains in contact and will automatically adjust the position of the elevator to keep the craft in ground effect, as also described above. Stage three allows the Amphfoil™ craft to maneuver across open waters when boat traffic and obstacles are at a minimum at high speeds of approximately 30 to 100 mph and possibly higher.

Referring now to FIGS. 6-12b, a second embodiment of the Amphfoil™ craft for three-stage operation is illustrated. In this embodiment, the same or similar elements as the previous embodiment are labeled with the same reference numbers, preceded with the numeral "1". In the first embodiment, hydrofoils 13a, 13b were provided to supply lift in order to aid movement of the Amphfoil™ craft from stage one to stage two. In the present embodiment, a gyration rotor 114 having two or more rotor blades 114a, 114b, 114c, 114d are provided to aid with lift from stage one to stage two. Depending on its size, the Amphfoil™ craft has either one set of rotors (i.e. 2 blades) or two counter rotating sets of rotors (i.e. 4 blades). The gyro-rotor 114 of the present embodiment is illustrated with four rotor blades 114a, 114b, 114c, and 114d. Auto gyration of the gyro-rotor 114 occurs when air is passed under a rotor blade causing the blades to spin, thus providing lift which may be used to save fuel once the Amphfoil™ craft is in ground effect. The gyro-rotor 114 in power (i.e. powered by the engine) provides lift to help raise the hydro-wing 112a from contact with the water and enables the Amphfoil™ craft to travel or "water-ski" across the water on the pair of hydrofloats 116a, 116b.

The Amphfoil™ craft is kept in stage two by adjusting engine power and controlling the angle of attack of the rotor blades 114 and the horizontal elevator 119 with the steering wheel, knob, or joystick. The rotor blades 114a, 114b, 114c, and 114d are also designed tilt fore and aft and port and starboard, as in conventional gyrocopters. During use, the Amphfoil™ craft climbs or descends by tilting the rotors 114 along the bow to stern axis, "L". Tilting the rotors 114 along the port to starboard axis helps stabilize the Amphfoil™ craft when crosswinds cause slip (or drifting) and can be used to help turn the Amphfoil™ craft. Both motions may be achieved by using the steering wheel, knob, or joystick from the cockpit 121.

Figure 7A:
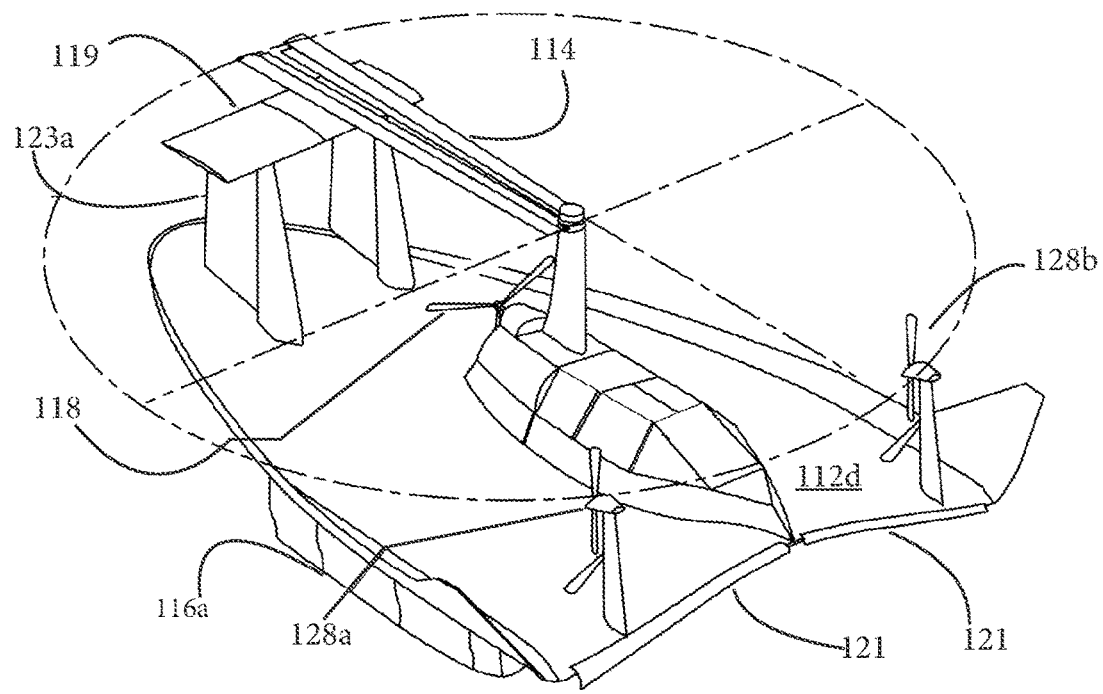
FIG. 7a is a perspective view of the three stage watercraft of FIG. 6 with blades folded in the plane of operation and aft.
Figure 7B:
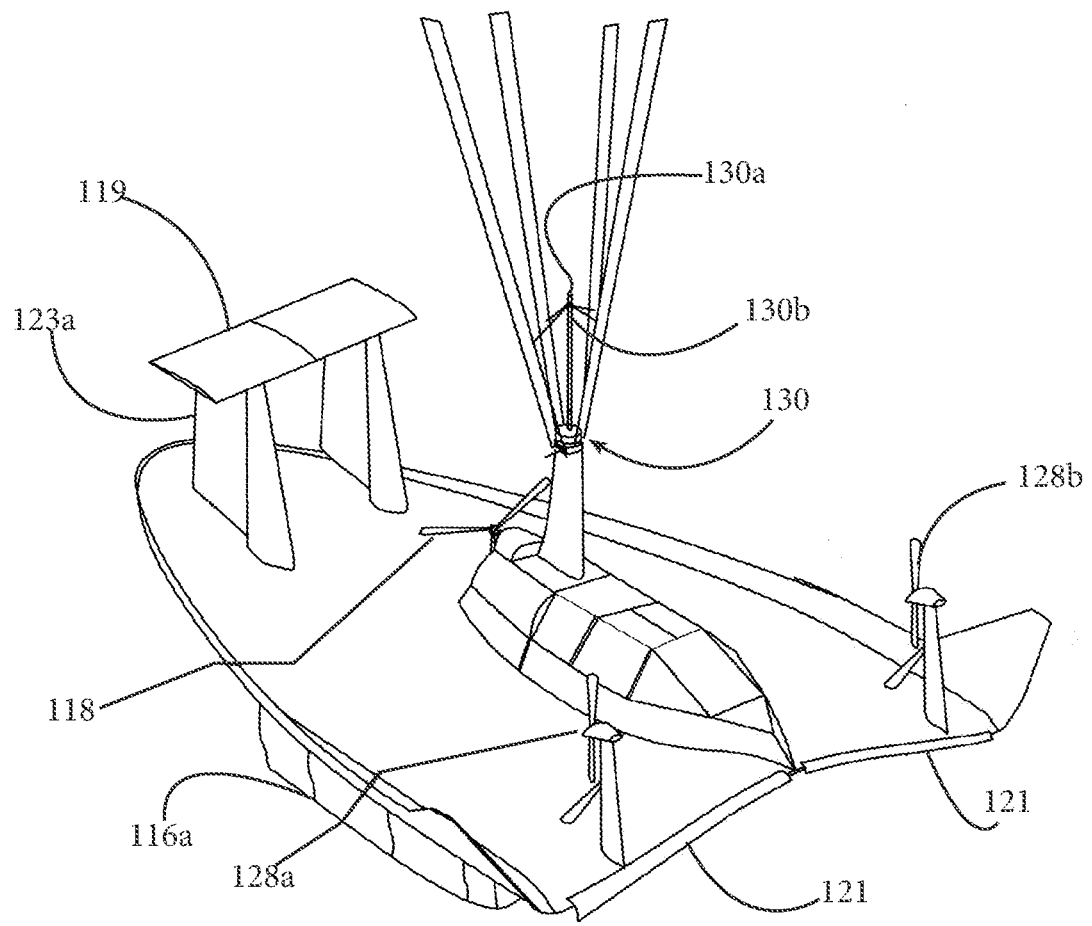
FIG. 7b is a perspective view of the three stage watercraft of FIG. 6 with blades folded vertically.
Figure 8:
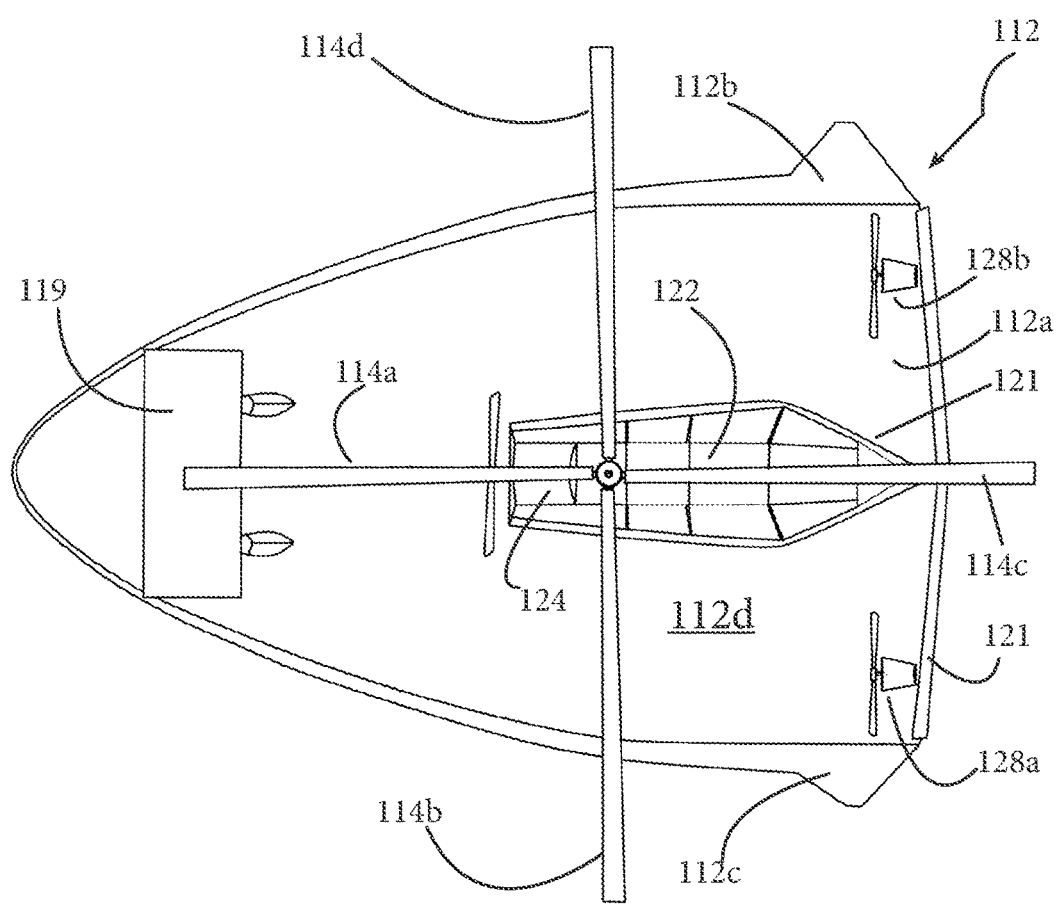
FIG. 8 is a top plan view of the three stage watercraft of FIG. 6.
Figure 9:
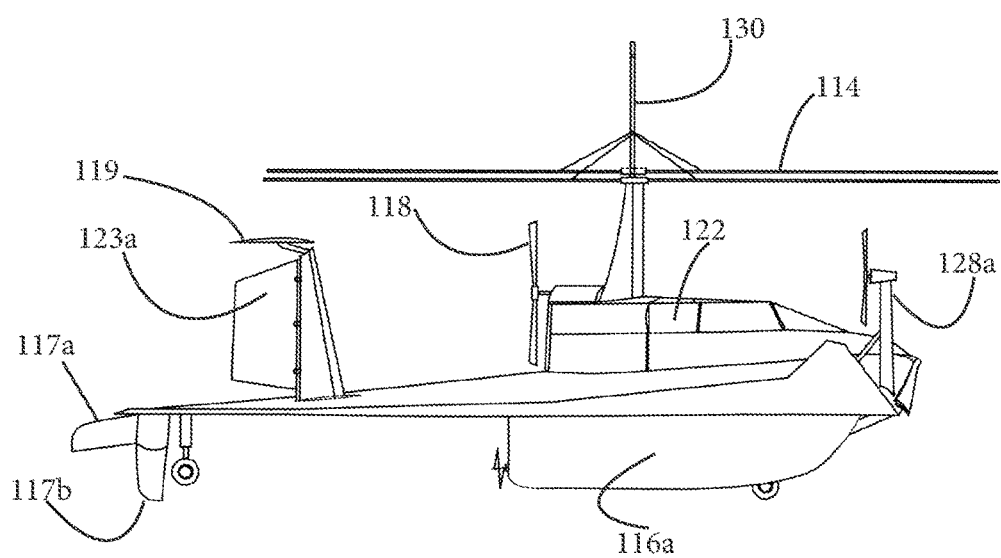
FIG. 9 is a side elevational view of the three stage watercraft of FIG. 6.
Figure 10:
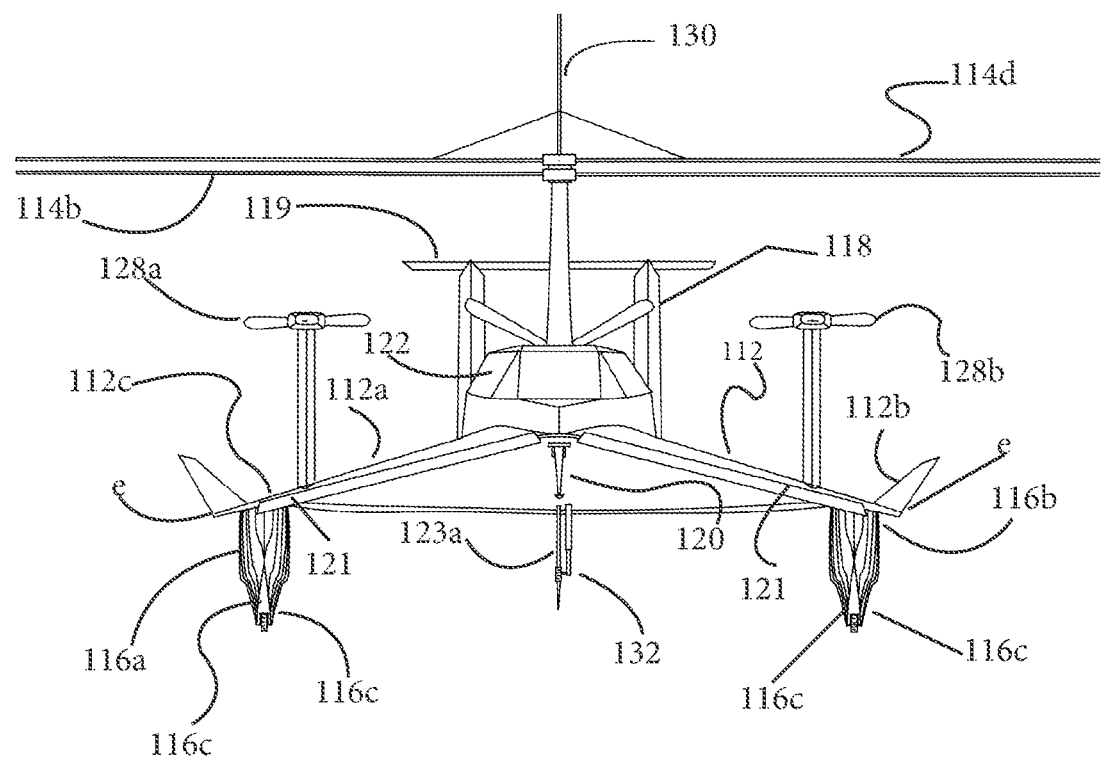
FIG. 10 is a front elevational view of the three stage watercraft of FIG. 6.
Figure 11:
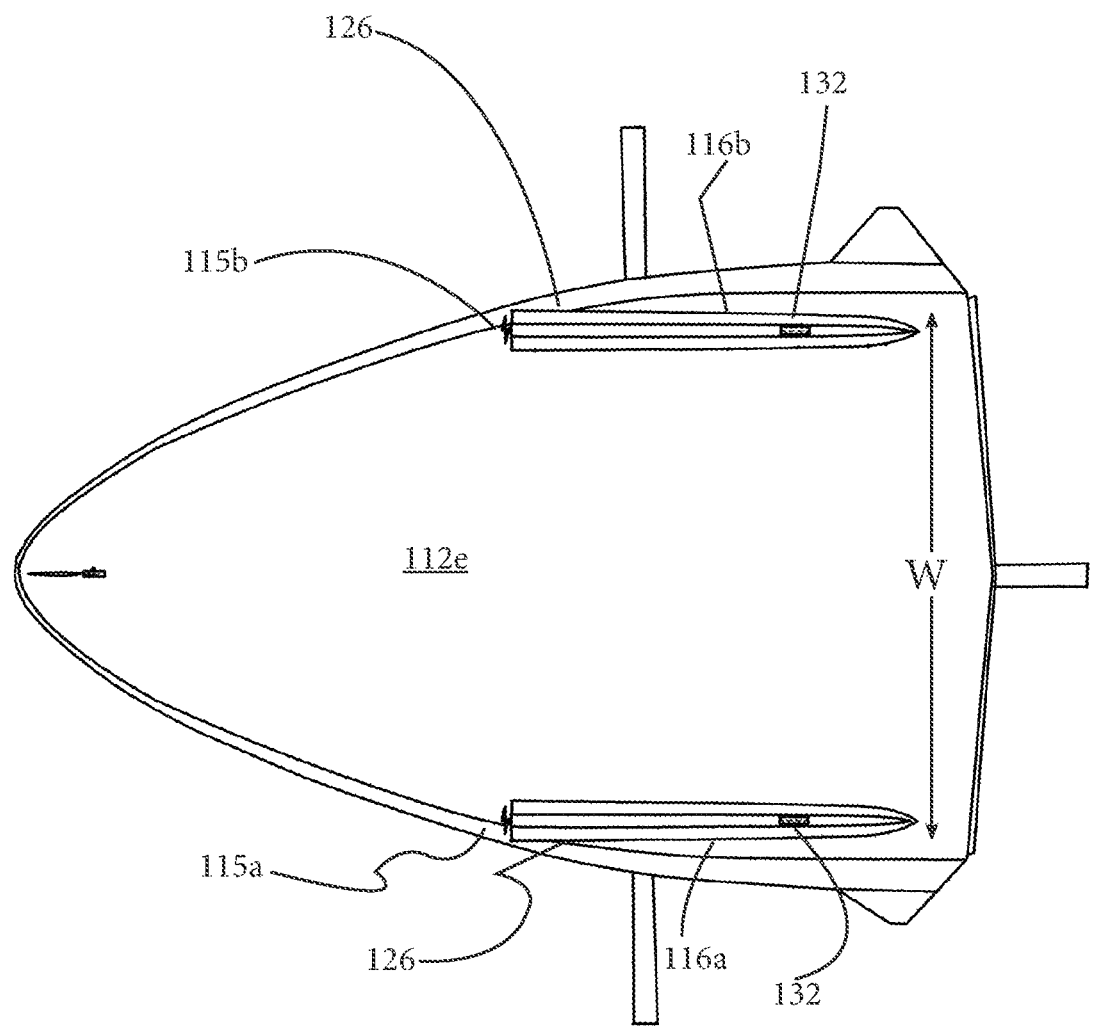
FIG. 11 is a bottom plan view of the three stage watercraft of FIG. 6.
Figure 12A:
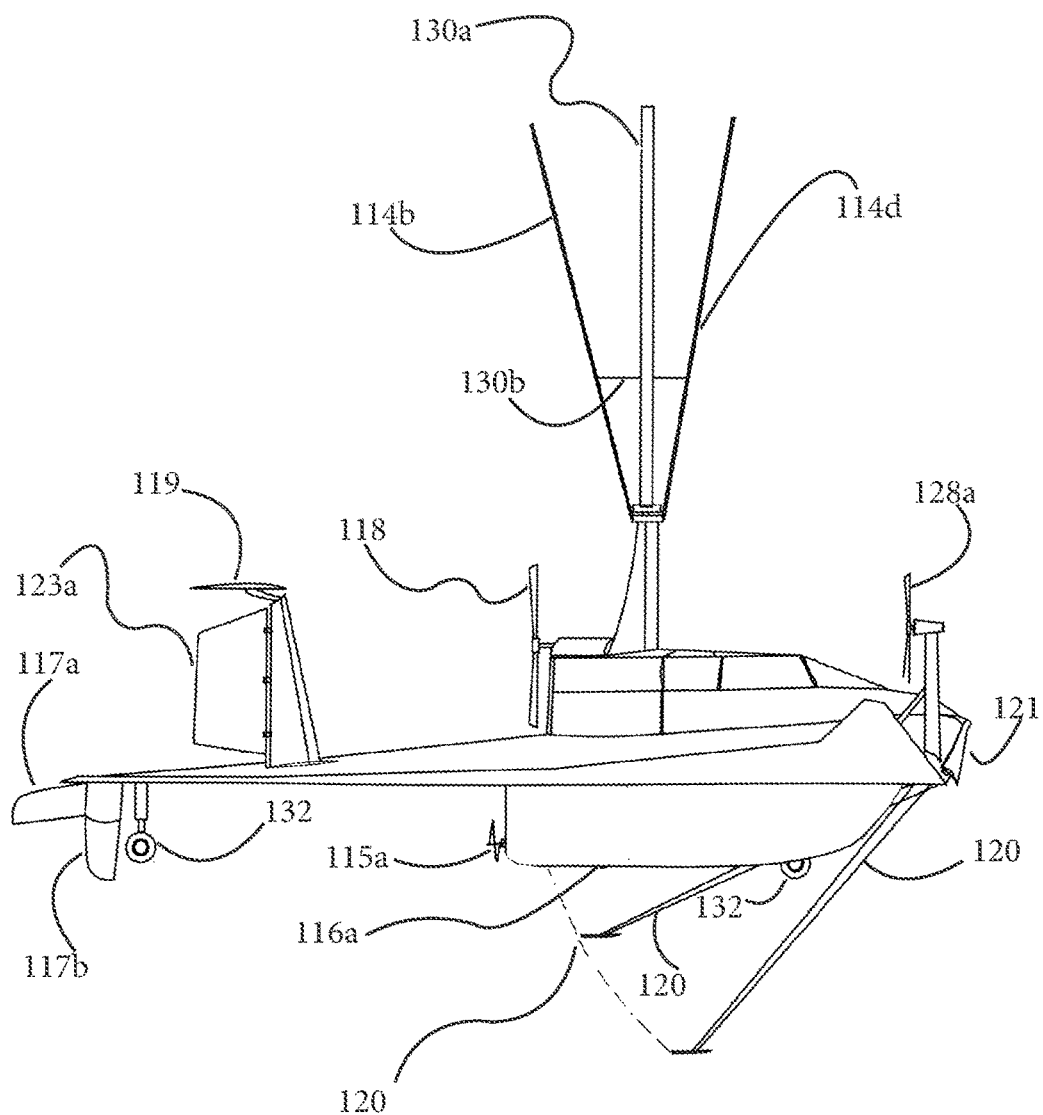
FIG. 12a is a side elevational view of the three stage watercraft of FIG. 6 with ATA extended and rotor vertical and non-operational.
Figure 12B:
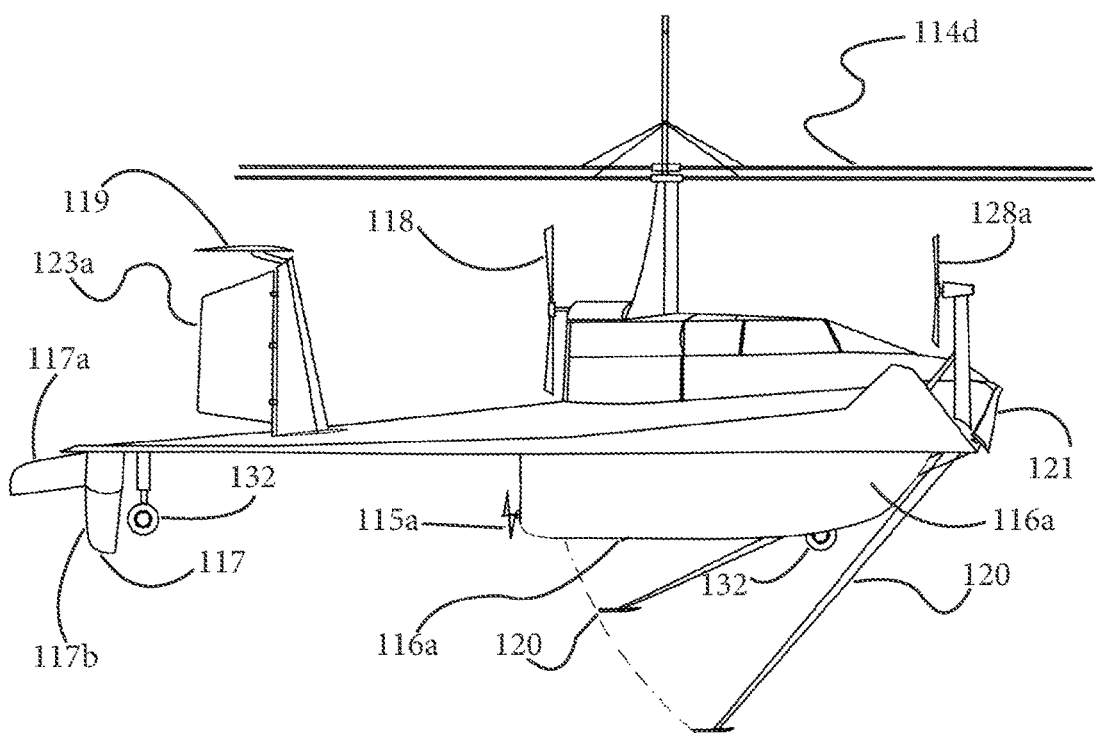
FIG. 12b is a side elevational view of the three stage watercraft of FIG. 6 with ATA extended and rotor operational.

The gyro-rotor 114 is relatively simple compared to a helicopter's rotor, and as such, the rotor blades 114a, 114b, 114c, and 114d on the Amphfoil™ craft can fold up using an "umbrella" type slide 130 device to reduce overall width for extremely tight docking and maneuvering situations as illustrated in FIG. 7b. The rotor blades 114a, 114b, 114c, and 114d on the Amphfoil™ craft can also be folded using a mechanism to place all the blades facing in one direction as illustrated in FIG. 7a.

Figure 6:
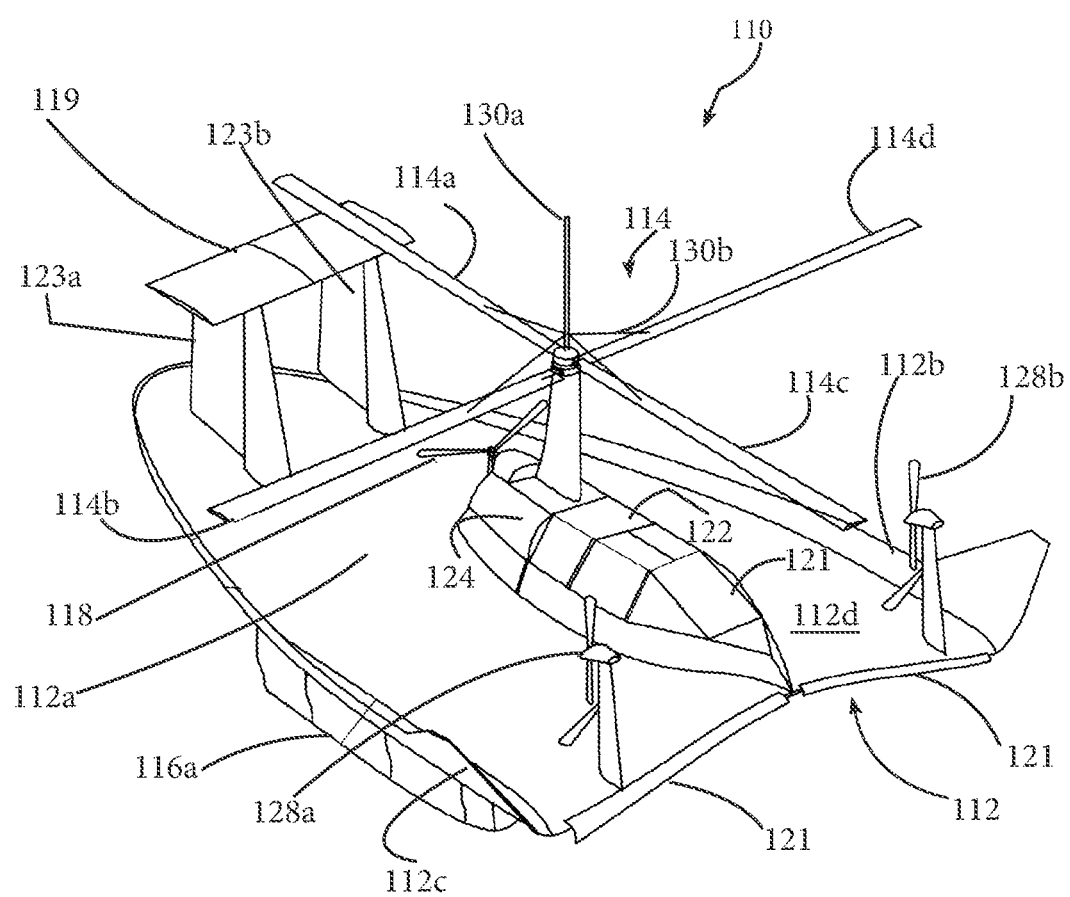
FIG. 6 is a front perspective view of a second exemplary embodiment of the three stage watercraft of the present application.

For larger Amphfoil™ crafts (35 feet and up) two forward rotating propellers 28a, 28b that can turn on their base between a forward and rear facing position, may also be provided to turn for steering purposes, particularly when fast or emergency turning is needed. (FIG. 6). When spinning the propellers 128a, 128b so that they are turned rearwardly the Amphfoil™ craft can be brought to an almost immediate stop. Propellers 128a, 128b also aid in increasing forward thrust and creating accelerated propeller "wash" or wind under the rotor blades 114a, 114b, 114c, and 114d to increase lift. Unlike helicopter rotors or blades, which pull air down to the blades, gyro-rotors 114 obtain lift from air/wind passing under the blades to create lift. So, the additional forward "prop wash" produced by the forward propellers 128a, 128b creates lift energy to the gyro rotors 114 in auto gyration that is normally wasted on propeller driven craft. As will be appreciated, the gyration rotor 114 provides lift and creates stage two speeds which have been previously unattainable, and are utilized with the Amphfoil™ craft when boat traffic, buoys and other obstacles are found. In order to effectively keep the Amphfoil™ craft at stage two, between approximately 10 to 30 mph, several operating parameters are utilized, including adjusting engine power, controlling the angle of attack of the rotor blades 114 and the horizontal elevator 119 by the knob, steering wheel or joystick. If the Amphfoil™ craft should come out of ground effect the gyro-rotors 114, which are rotating, help stabilize the Amphfoil™ craft.

Another unique aspect of the Amphfoil™ craft of the present embodiment is that when the rotors 114 are spinning under engine power, they will provide the necessary lift needed to keep the craft from sinking or bogging down in soft sand, mud or swamp conditions as it transitions from water to land. Cutting engine power and using the steering wheel/joy stick to change the angle of attack of the rotors 114 and the rear elevator 119 quickly cause the entire hull in the water to come to a stop in order to accomplish emergency stopping in very short distances.

Figure 13:
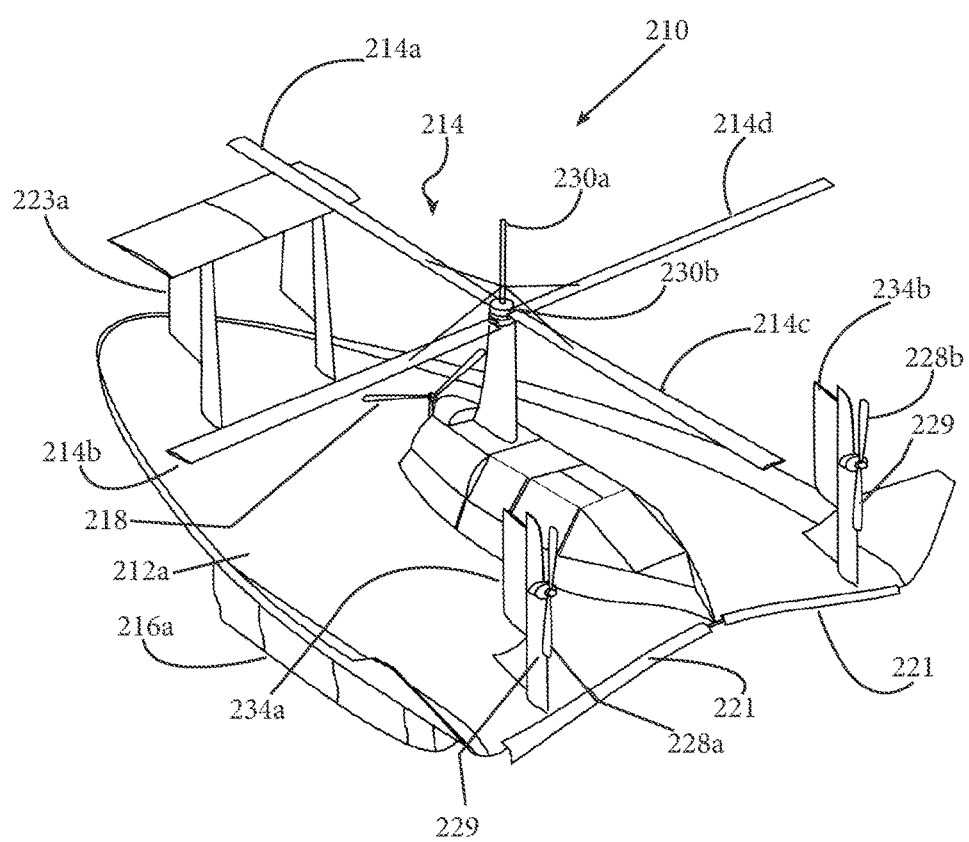
FIG. 13 is a front perspective view of a third exemplary embodiment of the three stage watercraft of the present application with forward facing props and air rudders facing rearward behind the props.
Figure 14:
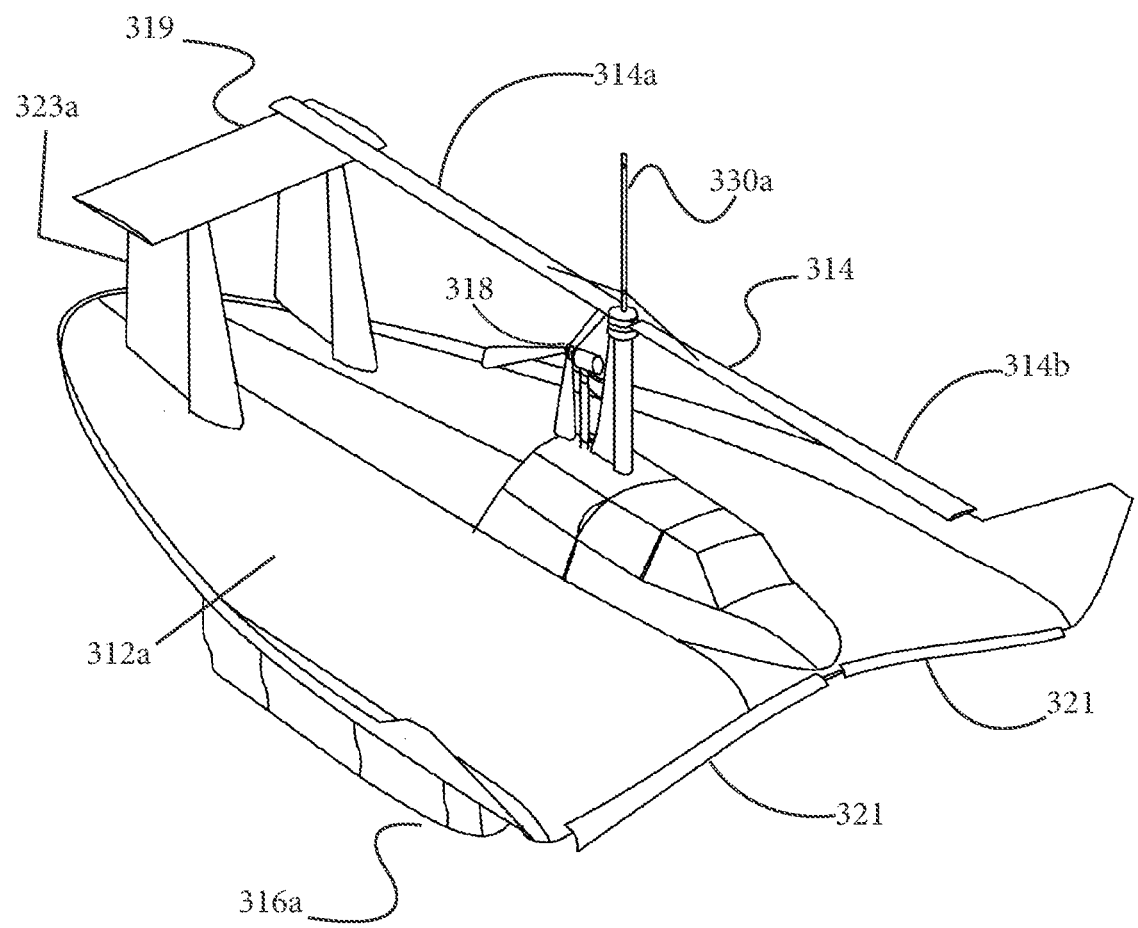
FIG. 14 is a front perspective view of a fourth exemplary embodiment of the three stage watercraft of the present application.
Figure 15A:
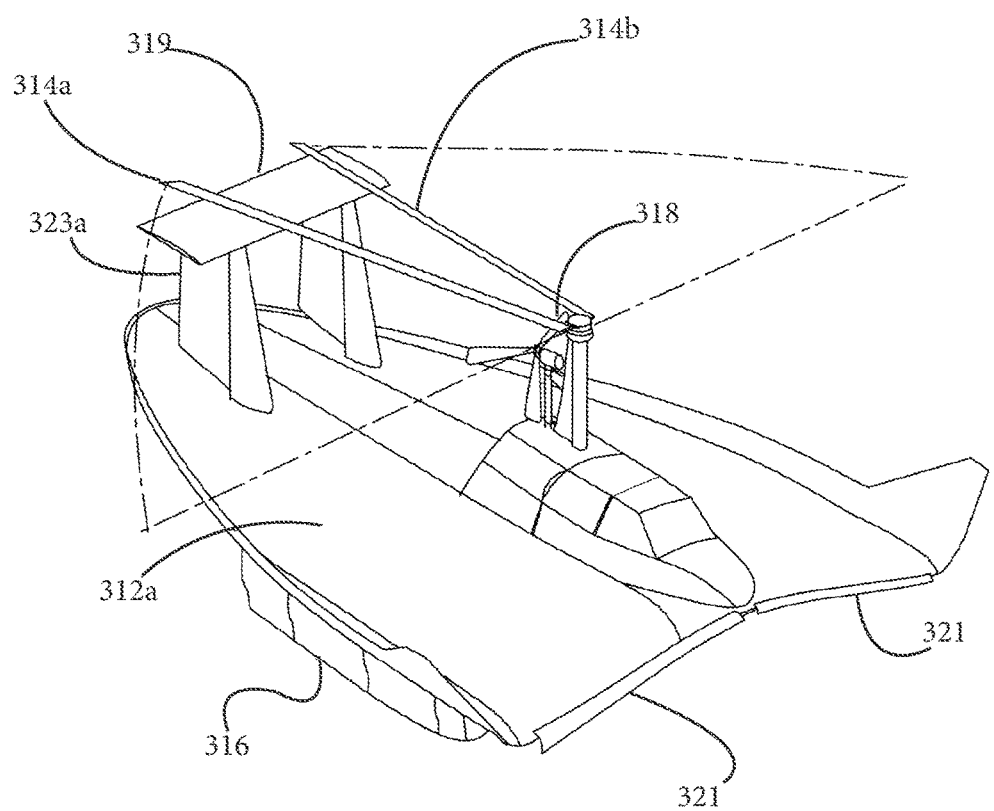
FIG. 15a is a perspective view of the three stage watercraft of FIG. 14 with blades folded in the plane of operation and aft.
Figure 15B:
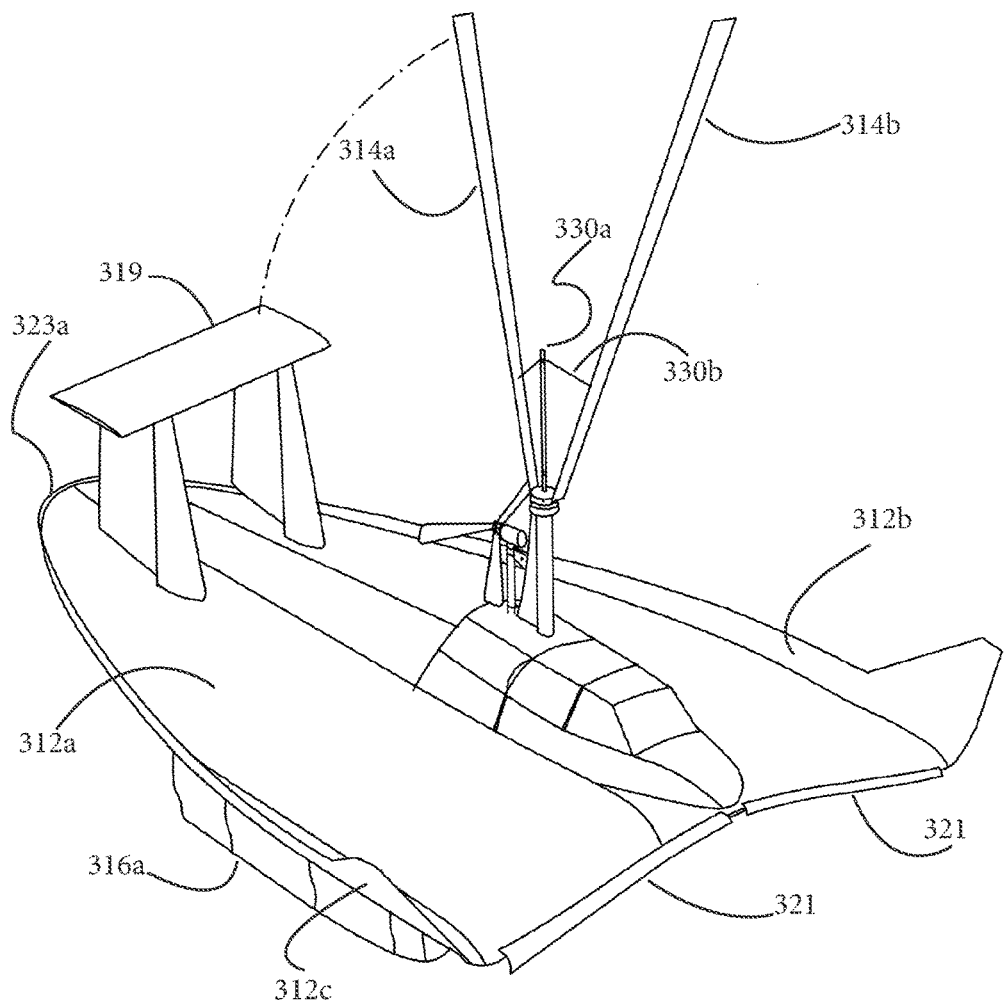
FIG. 15b is a perspective view of the three stage watercraft of FIG. 14 with blades folded vertically.
Figure 16A:
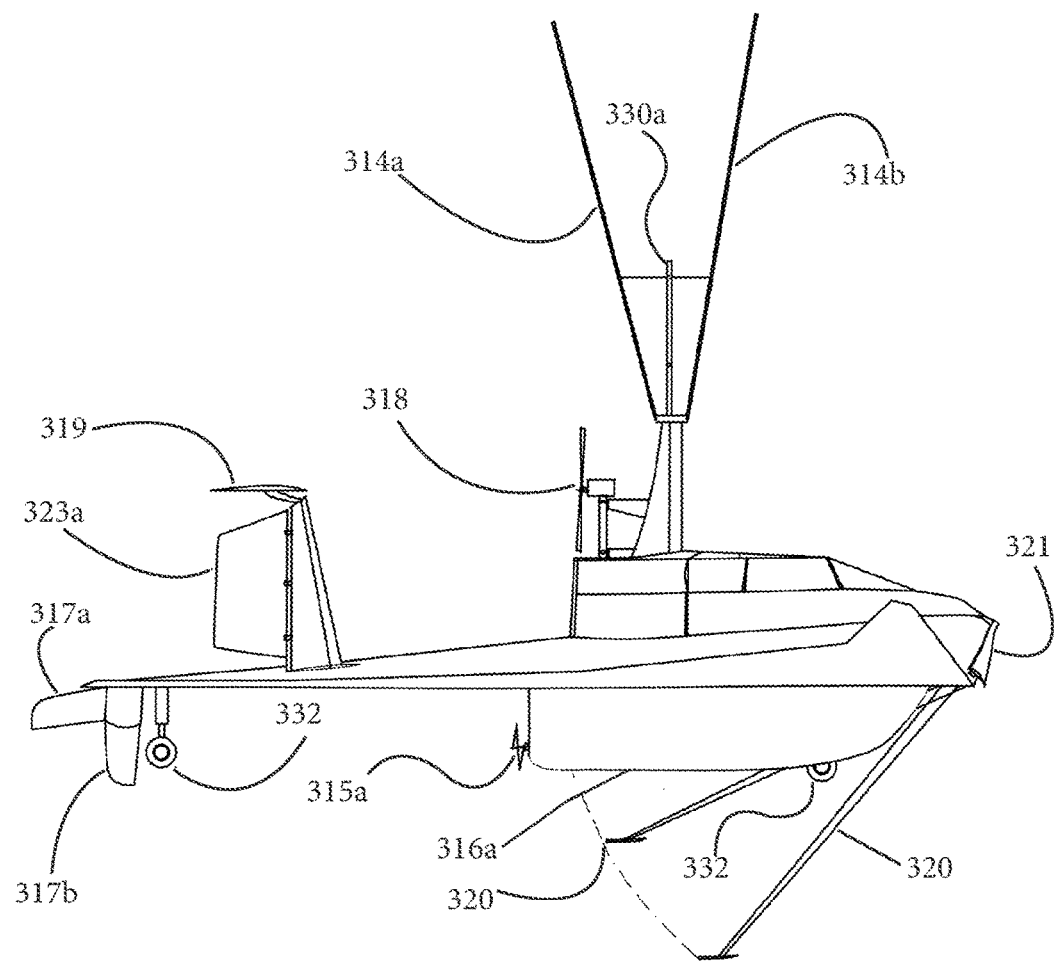
FIG. 16a is a side elevational view of the three stage watercraft of FIG. 14 with ATA extended and rotor vertical and non-operational.
Figure 16B:
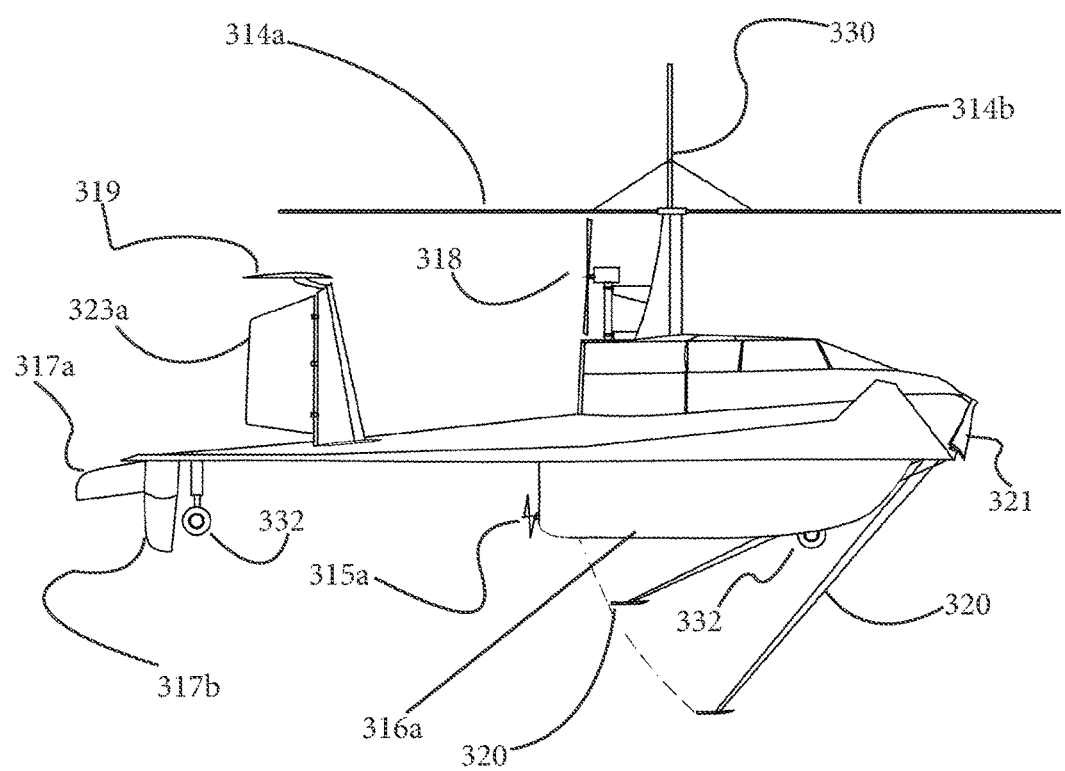
FIG. 16b is a side elevational view of the three stage watercraft of FIG. 14 with ATA extended and rotor operational.
Figure 17:
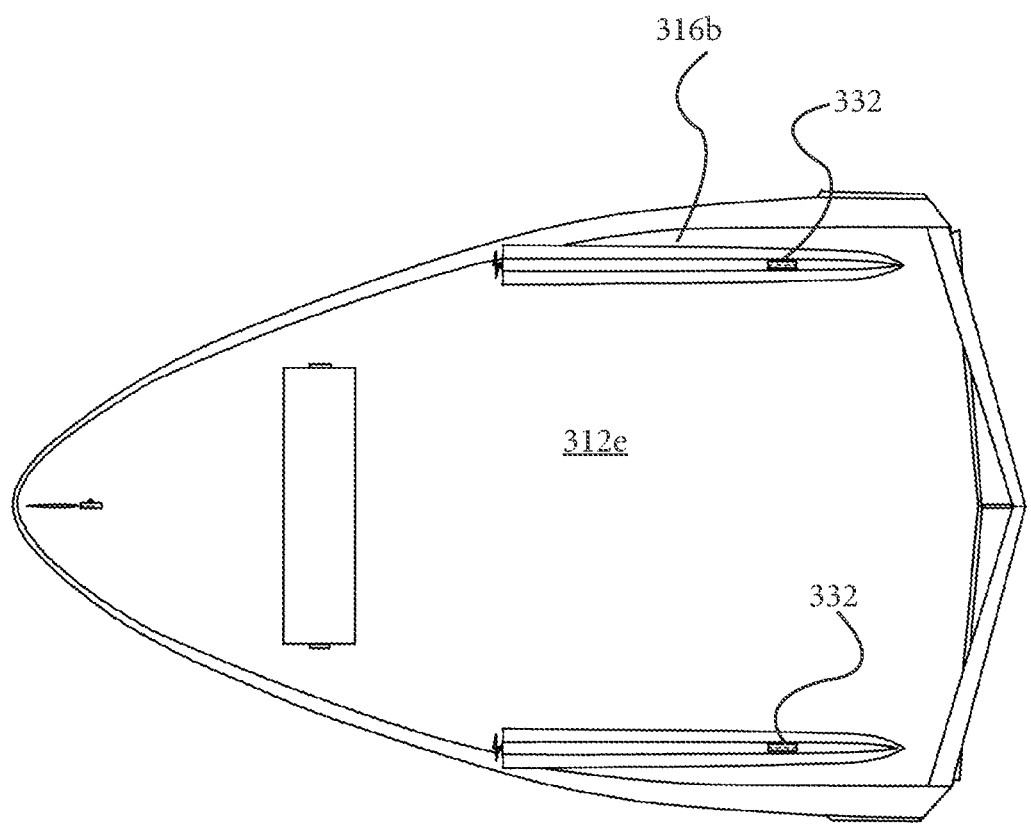
FIG. 17 is a bottom plan view of the three stage watercraft of FIG. 14.

Referring now to FIG. 13, an exemplary third embodiment of the Amphfoil™ craft of the present application is illustrated. In this embodiment, the same or similar elements as the previous embodiment are labeled with the same reference numbers, preceded with the numeral "2". In the previous embodiment, the air propellers 228a, 228b pivot to for turning the Amphfoil™ craft 210, particularly quickly, in emergency situations. While turning quickly may be needed in certain situations, when the Amphfoil™ craft is in ground effect it is desirable to limit turning for safety purposes. However, in stage two for obstacle emergency it is desirable to give control to pilot to turn as needed. A turn-limiting device to limit turning of the propellers 228a, 228b during stage three may, also be provided. As shown in FIG. 13, forward air propellers, 228a, 228b are stationary, and do not rotate, i.e. turn, from front to back to effectuate turning. Instead, forward air rudders 234a, 234b are mounted behind air propellers 228a, 228b, and move independently of air propellers 228a, 228b. Forward air rudders 234a, 234b can be used to facilitate quick turning in stage two but may be disabled in stage three as desired.

Referring now to FIGS. 14-17, an exemplary fourth embodiment of the Amphfoil™ craft of the present application is illustrated. In this embodiment, the same or similar elements as the previous embodiment are labeled with the same reference numbers, preceded with the numeral "3". In the first embodiment, air propellers 328a, 328b are provided to aid in turning Amphfoil™ craft 312 which is about 35 feet or larger. In the present embodiment a Amphfoil™ craft 312 is illustrated which is less than about 35 feet in length. At the smaller length forward air propellers 328a, 328b may be eliminated and turning can be provided by propeller 318 whose blades spin and which can be pivoted 70 degrees or 35 degrees each side of center, to facilitate turning of Amphfoil™ craft 312 as discussed herein above with respect to the first embodiment. On very small 2-4 seat Amphfoil™ crafts the propeller may not turn or pivot and instead, only rear air rudders may be used to steer in this embodiment. The engines utilized for the present embodiment may also be smaller, as disclosed above, and the other dimensions can also be appropriately adjusted. The Amphfoil™ craft as disclosed herein is not constrained by size limitations. Regardless of the size, the Amphfoil™ craft 312 of the present embodiment operates in the same manner, i.e. in three stages, as disclosed with respect to the previous embodiments.

Figure 18A:
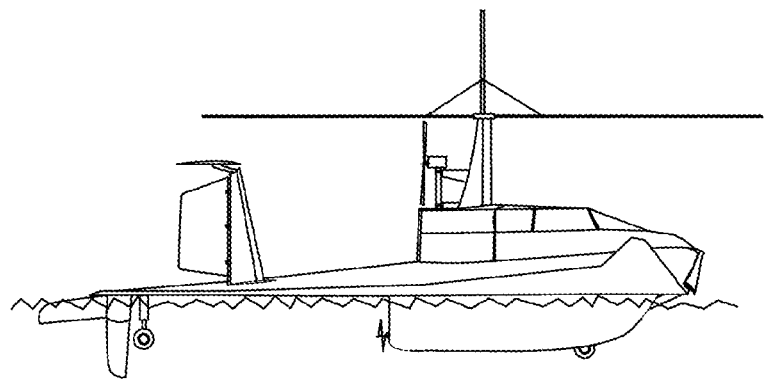
FIG. 18a is a schematic drawing of any of the three stage watercraft of FIGS. 6-17 traveling in Stage One.
Figure 18B:
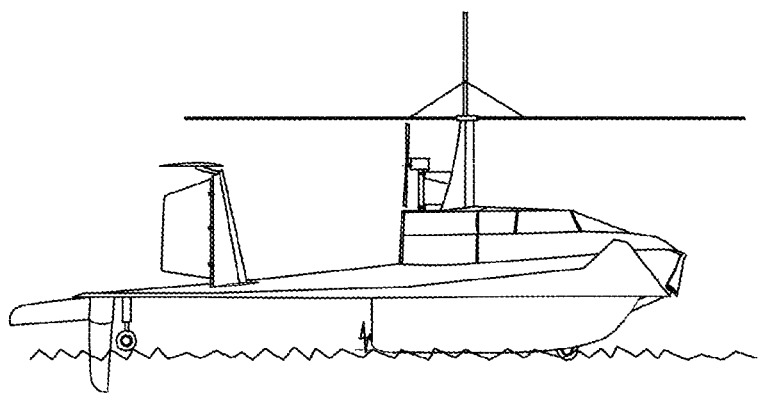
FIG. 18b is a schematic drawing of any of the three stage watercraft of FIGS. 6-17 traveling in Stage Two.
Figure 18C:
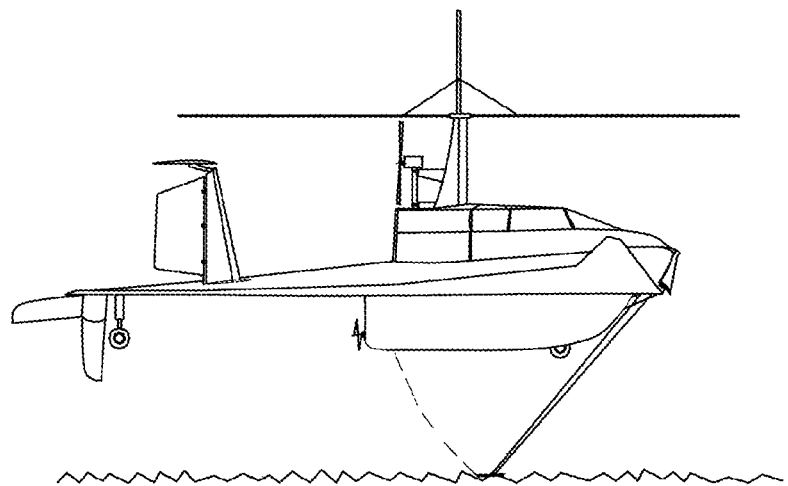
FIG. 18c is a schematic drawing of any of the three stage watercraft of FIGS. 6-17 traveling in Stage Three.

Operation of the Amphfoil™ craft having rotors will now be described in stage one, stage two and stage three with reference to FIGS. 18a to 18c.

In stage one, the Amphfoil™ craft handles like a conventional twin engine power boat at speeds below about 10 mph., for example during docking and refueling of the Amphfoil™ craft. During this stage the hydrofloats 116a, 116b remain submerged, propulsion is achieved with single lever (one handle for forward, reverse and throttle) control for each hydrofloat drive (i.e. propeller or otherwise), and the water rudder 117 is likewise submerged and utilized for tight turning. The rotor 114 is either folded up or towards one side, and is not in use, and neither are the air propellers. As speed of the Amphfoil™ craft increases above about 10 mph stage two is achieved.

During stage two the Amphfoil™ craft is lifted relative to the water by the gyro-rotor 114 such that the hydro-wing is raised above the water's surface while the hydro-floats 116a, 116b remain in contact with the water's surface as they travel across the top of it (i.e. "water-ski"). In stage two the ATA 120 is also in contact with the water as the hydro-wing 112 is raised above the surface of the water. As detailed above, the Amphfoil™ craft is kept at stage two by adjusting engine power, controlling the angle of attack of the rotor blades and the horizontal elevator. The Amphfoil™ craft can climb or descend by tilting the rotors along the bow to stern axis. The Amphfoil™ craft turns by tilting the rotors along the port to starboard axis. The air propellers and rudders as disclosed herein above achieve turning of the Amphfoil™ craft in stage two. Stage two allows the Amphfoil™ craft to travel at faster speeds of about 10-30 mph while maneuvering safely across crowded waterways. Above about 30 mph the Amphfoil™ craft enters stage three.

Stage three operation of the Amphfoil™ craft is fully functional ground effect mode where the hydro-wing 112 and hydrofloats 116a, 116b are both above the water, or any solid surface while the ATA 120 remains in contact with the surface. In stage three (as in stage two) the Amphfoil™ craft also turns using rotors, propellers and air rudders instead of banking like an aircraft as with the prior WIG craft. The Amphfoil™ craft can climb or descend by tilting the rotors along the bow to stern axis but the ATA remains in contact and will automatically adjust the position of the elevator to keep the Amphfoil™ craft in ground effect, as also described above. Stage three allows the Amphfoil™ craft to maneuver across open waters when boat traffic and obstacles are at a minimum at high speeds of approximately 30 to 100 mph and possibly higher.

Figure 19:
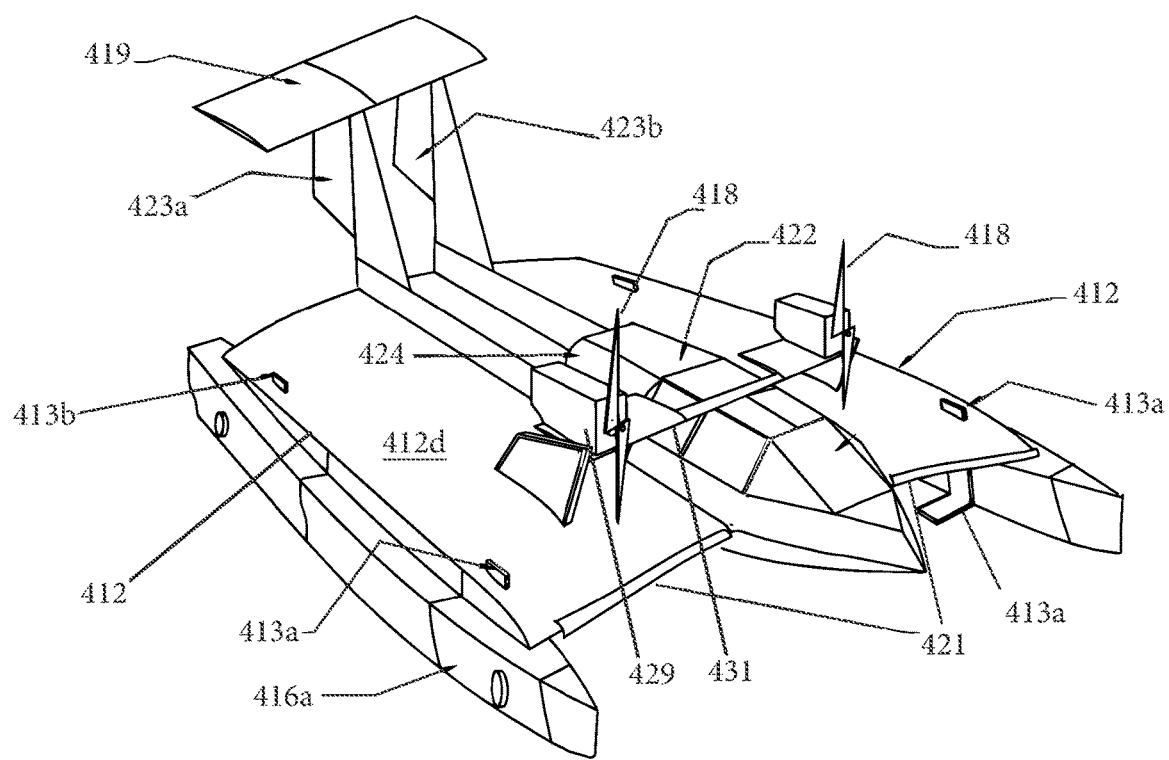
FIG. 19 is a front perspective view of a fifth exemplary embodiment of the three stage watercraft of the present application.
Figure 20:
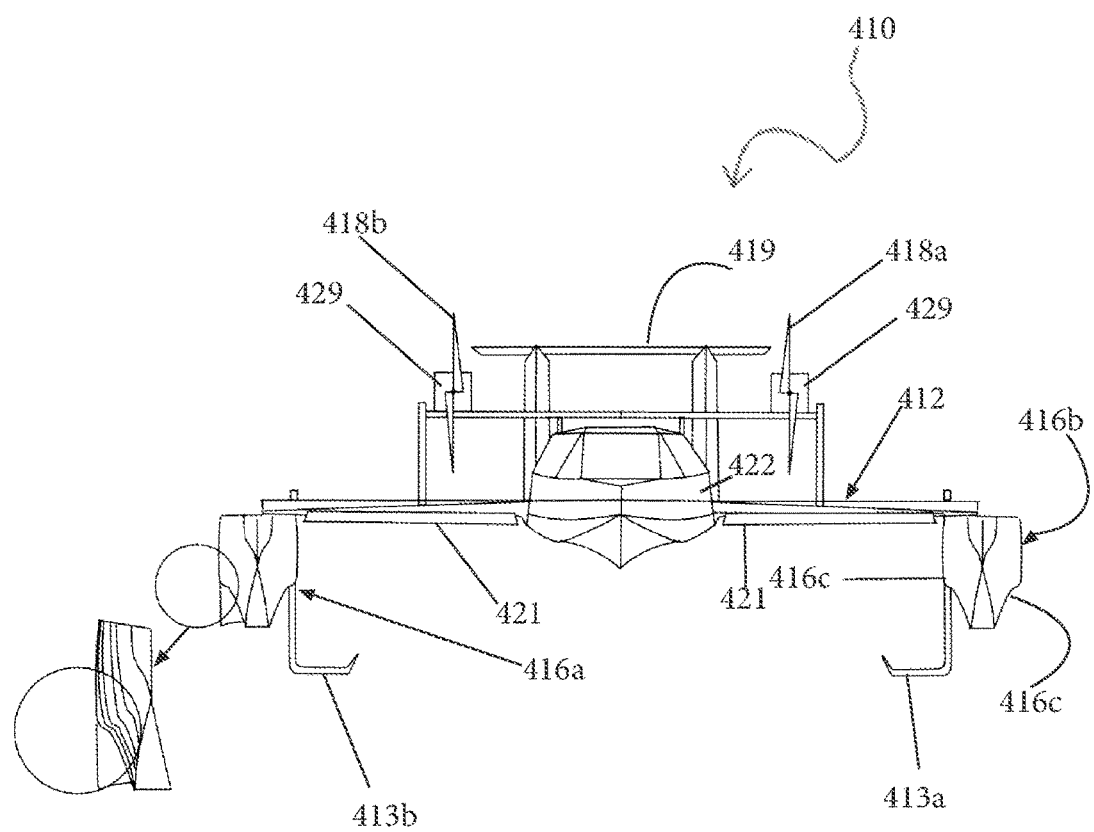
FIG. 20 is a front elevational view of the three stage watercraft of FIG. 19.

In the first embodiment, a rotational air propeller 18, supported by the hydro-wing 12 is described to help effectuate turning and forward thrust. In the second embodiment, two forward rotating propellers 28a, 28b are described, which rotate on their bases (i.e. turn or pivot about a vertical axis between a forward and rearward facing position) to aid in turning, particularly in emergency situations, and which also aid in increasing forward thrust (see FIG. 6). Referring now to FIGS. 19-23, an exemplary fifth embodiment of the Amphfoil™ craft for three-stage operation including one or more propellers that pivot about a horizontal axis of a support member is illustrated. In this embodiment, the same or similar elements as the previous embodiments are labeled with the same reference numbers, preceded with the numeral "4". The three-stage watercraft 410 is substantially the same as disclosed with respect to FIGS. 1-5c, with the addition of pivoting air propellers 418a, 418b. Air propellers 418a, 418b rotate in a circular manner, as is conventional, and provide propulsion i.e. by creating forward thrust, and also to provide lift, by pivoting between zero and ninety degrees relative to the plane of travel of the Amphfoil™ craft 410, as described below. In the present embodiment, air propellers 418a, 418b and their corresponding engine pods 429 that power the propellers, are pivotally mounted to a horizontal support member 431 so as to pivot or tilt about the support member 431, as desired, and are further supported by the hydro-wing 412. The pivotally mounted, rotating air propellers 418a, 418b and engine pods 429 may be positioned at respective port and starboard sides of the cockpit 421 on support member 431, as best shown in FIGS. 19 and 20.

Figure 21:
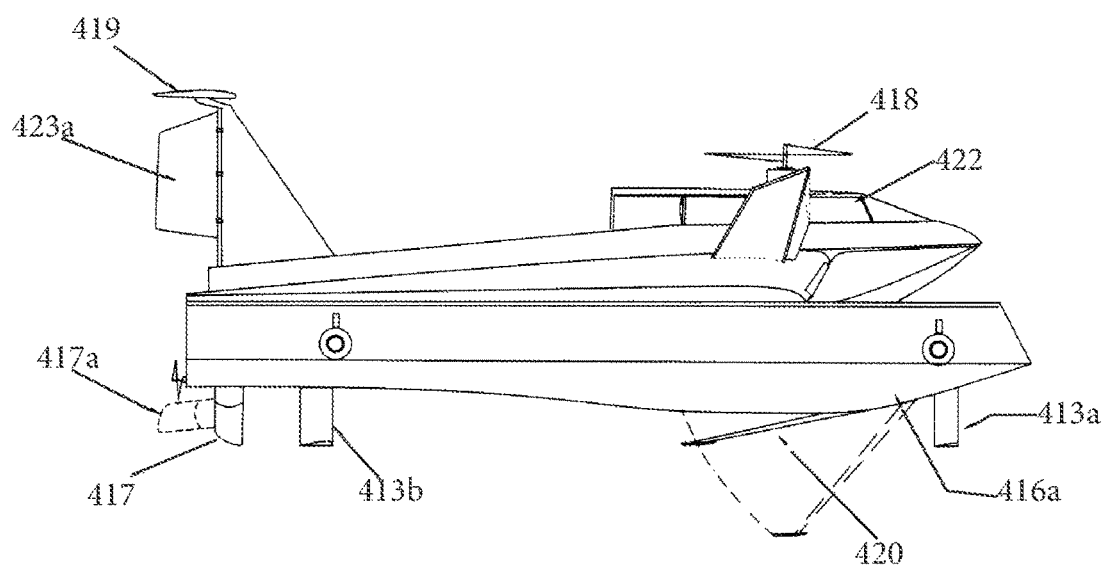
FIG. 21 is a schematic drawing of the three stage watercraft of FIGS. 19-20 with the rotatable propellers in a horizontal orientation.
Figure 22:
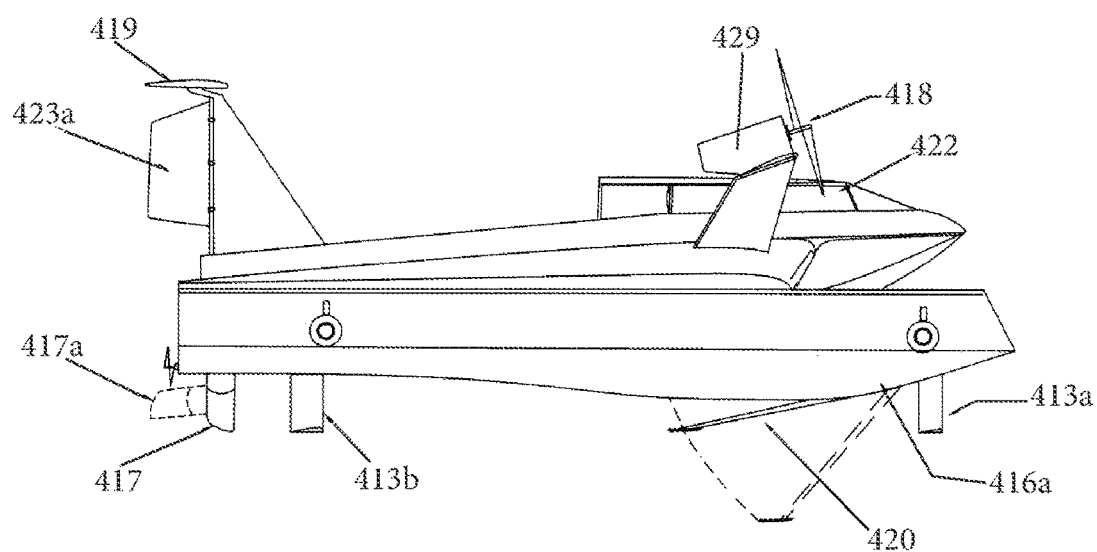
FIG. 22 is a schematic drawing of the three stage watercraft of FIGS. 19-20 with the rotatable propellers in a mid-way orientation.
Figure 23:
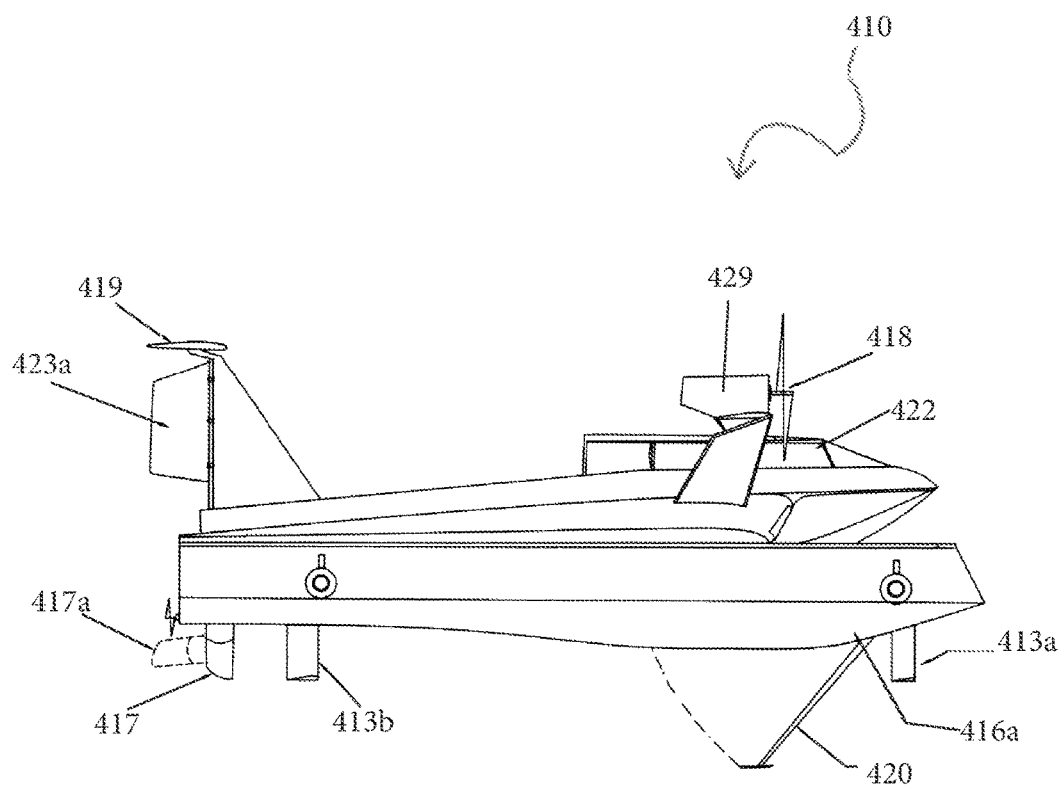
FIG. 23 is a schematic drawing of the three stage watercraft of FIGS. 19-20 with the rotatable propellers in a vertical orientation.

The pivotally mounted, rotating air propellers 418a, 418b are designed to pivot or tilt incrementally between a horizontal orientation, i.e. where the plane of rotation of the propellers is relatively parallel to the plane of travel of the craft, as shown in FIG. 21, and a vertical orientation where the plane of rotation is relatively perpendicular to the plane of travel, as shown in FIG. 23, dependent upon the amount of thrust and vertical lift desired. Once pivoted into the desired orientation the air propellers 418a, 418b can be locked into place, as would be known to one of skill in the art. For providing more lift capabilities, the pivotally mounted air propellers 418a, 418b are angled so that the plane of rotation of the propellers is horizontal, lifting in the same way as a helicopter rotor, as best shown in FIG. 21. The two pivotally mounted air propellers 418a, 418b may be progressively and incrementally tilted forward, with the plane of rotation of the air propellers 418a, 418b eventually becoming substantially vertical relative to the travel plane of craft 410, as best shown in FIG. 23. In this mode, the tiltable air propellers 418a, 418b provide increased thrust.

As will be appreciated, the two pivotally mounted air propellers 418a, 418b of the present embodiment can be configured and oriented to provide propulsive and lifting forces to the Amphfoil™ craft, dependent upon a selectable pivot angle of the propeller. As such, a mid-way orientation may also be desired, where the plane of rotation of the propellers 418a, 418b is somewhere between substantially parallel to the plane of travel of the craft (FIG. 21) and substantially vertical to the plane of travel (FIG. 23), the mid-way orientation being best shown in FIG. 22. In this position, the lift provided is less than provided in the horizontal position shown in FIG. 21, and more than provided in the vertical position show in in FIG. 23. Likewise, the propulsion in this position is less than provided in the vertical position show in FIG. 23, but more than provided in the horizontal position shown in FIG. 21.

Operation of the Amphfoil™ craft in stage one, stage two and stage three will now be described with reference to FIGS. 24a to 24c.

Figure 24A:
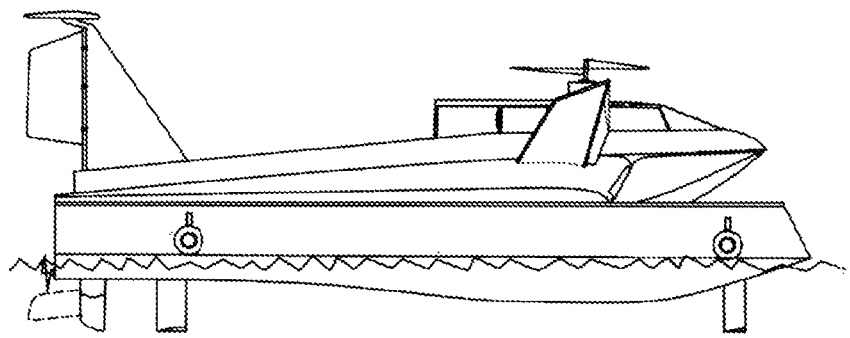
FIG. 24a is a schematic drawing of the three stage watercraft of FIGS. 19-20 traveling in Stage One.

Referring initially to FIG. 24a, when the two pivotally mounted air propellers 418a, 418b are oriented substantially horizontally, relative to the plane of travel of the Amphfoil™ craft 410, a lifting force is generated which raises the hull in order to create a smoother ride across choppy and boat wake filled waters. This substantially horizontal orientation of the air propellers 418a, 418b, is contemplated for use in stage one, where the Amphfoil™ craft handles like a conventional twin engine power boat, traveling in the water, as described above with respect to the previous embodiments.

Figure 24B:
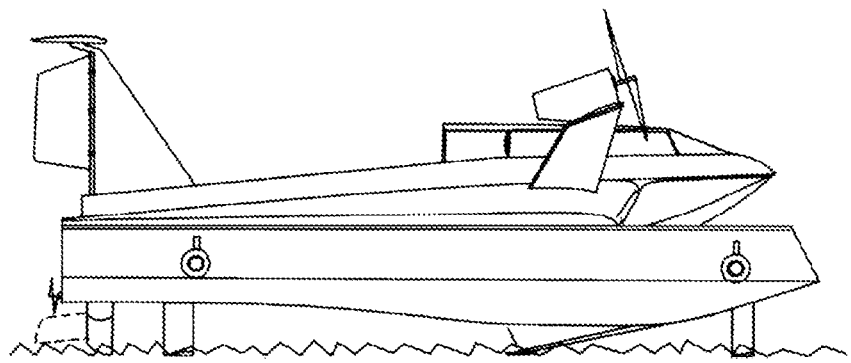
FIG. 24b is a schematic drawing of the three stage watercraft of FIGS. 19-20 traveling in Stage Two.

Referring now to FIG. 24b, the two pivotally mounted air propellers 418a, 418b are shown oriented at a mid-way pivot angle, for example, in the range of 20-40 degrees from the horizontal plane of travel of the Amphfoil™ craft 410. It is understood that 20-40 degrees is shown by way of example only and may be varied anywhere between 0-90 degrees, depending upon the desired increase or decrease in lift and/or forward thrust. In this mid-way orientation, the the Amphfoil™ craft 410 will experience a combination of forward thrust and vertical lift. For example, a 30 degree tilt orientation where the two pivotally mounted air propellers 418a, 418b are locked at a 30 degree orientation from the horizontal plane is contemplated for use in stage two. With a 30 degree tilt, the Amphfoil™ craft is both lifted relative to the water by the tiltable air propellers 418a, 418b such that the hydro-wing 412 is raised above the water's surface while the hydro-floats 416a, 416b remain in contact with the water's surface as they travel across the top of it (i.e. "water-ski") and is providing forward thrust, i.e. propulsion as well. As discussed above, the Amphfoil™ craft is kept at stage two by adjusting engine power, speed and the horizontal elevator, and through tilting the air propellers 418a, 418b for increased or decreased lift and propulsion, as desired. As will be appreciated, the closer the propellers 418a, 418b are to horizontal in stage two, the greater the lift, while the closer they are to vertical in stage two, the lesser the lift and the greater the propulsion. Thus, in stage two the tilt, or angle of the propellers 418a, 418b, will be adjusted according to conditions and the needs of the Amphfoil™ craft as it travels and maneuvers across waterways.

Figure 24C:
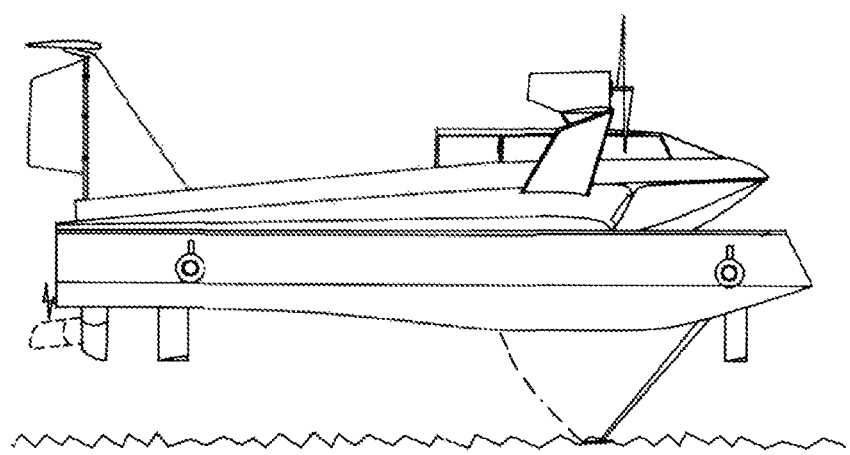
FIG. 24c is a schematic drawing of the three stage watercraft of FIGS. 6-17 traveling in Stage Three.

Referring now to FIG. 24c, the two pivotally mounted air propellers 418a, 418b are oriented substantially vertically, relative to the plane of travel of the Amphfoil™ craft 410. In this orientation, both an upward lift and forward propulsion is also generated. The substantially vertical tilt orientation (of about 90 degrees) of the two pivotally mounted air propellers 418a, 418b relative to the horizontal plane of travel of the craft 410 is contemplated for use in stage three. During stage three operation, as in the previous embodiments, the Amphfoil™ craft is in fully functional ground effect mode where the hydro-wing 412 and hydrofloats 416a, 416b are both above the water, or any solid surface, while the ATA 520 remains in contact with the surface. In stage three (as in stage two) the Amphfoil™ craft also turns using propellers and air rudders instead of banking like an aircraft as with the prior WIG craft. Stage three allows the Amphfoil™ craft to maneuver across open waters when boat traffic and obstacles are at a minimum at high speeds up to approximately 100 mph and possibly higher.

It will be understood by those skilled in the art that various changes in form and details may be made herein without departing from the spirit and scope of the invention as defined by the appended claims. For example, the materials disclosed herein may be readily changed, as may the dimensions and geometric configurations. Likewise, the different stages disclosed herein may be reached at different speeds than anticipated, and portions of the craft that are illustrated as one piece may be made of multiple pieces and multiple pieces may be combined into fewer pieces, as would be know to those of skill in the art. The hydro-wing itself may have a different configuration other than that which is illustrated, provided that it functions in at least the first and third stages. Also, elements that are shown in combination may be shown in different combinations or may be eliminated. Thus, the details of these components as set forth in the above-described examples, should not limit the scope of the claims.

Further, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. A watercraft for three-stage operation, in a first stage the watercraft riding in the water as a boat, in a second stage the watercraft riding on the surface of the water, and in a third stage the watercraft being in contact with the water while traveling in ground effect, the watercraft comprising:
   a hydro-wing including a combined hull and wings, the hull constructed and arranged to support a cabin, and the wings constructed and arranged to provide lift, a bottom surface of the combined hull and wings forming a substantially continuous ground effect surface of the hydro-wing;
   at least a single hydrofoil supported by the hydro-wing;
   a pair of outboard hydro-floats supported on the bottom surface of the hydro-wing on a port and a starboard side thereof; and
   at least one pivotally mounted air propeller, pivotal between a first position substantially parallel to a horizontal plane of travel of the watercraft and second position substantially vertical to a horizontal plane of travel of the watercraft.

2. The watercraft of claim 1, wherein in the first stage of operation of the watercraft riding in the water, the at least one pivotally mounted air propeller is in the first position to provide lift.

3. The watercraft of claim 1, wherein in the third stage of operation of the watercraft travelling in ground effect, the at least one pivotally mounted air propeller is in the second position to provide forward thrust.

4. The watercraft of claim 1, wherein in the second stage of operation of the watercraft riding on the surface of the water, the at least one pivotally mounted air propeller is in a mid-way position between the first position and the second position to provide combined lift and forward thrust.

5. The watercraft of claim 1, wherein the hydro-floats each include one or more concavities constructed and arranged to create a positive turbulence as water passes by the concavity and turns in a vortex to create additional lift of the hydro-wing.

6. The watercraft of claim 1, wherein the at least a single hydrofoil comprises a forward hydrofoil supported on the forward portion of the hydro-wing, and an aft hydrofoil supported on the rear portion of the hydro-wing, the hydrofoils being constructed and arranged to provide lift to transition the watercraft from stage one to stage two.

7. The watercraft of claim 6, wherein the forward hydrofoil and the aft hydrofoil are movable between a first, in-use position where the forward and aft hydrofoils engage the water and a second, stored position where the forward and aft hydrofoils are positioned under and adjacent the bottom surface of the hydro-wing hull.

8. The watercraft of claim 1, further comprising:
   a steering device operatively connected to a rear elevator
   at least a pair of air rudders operatively attached to at least one water rudder; and
   wherein the steering device, elevator, pair of air rudders and at least one water rudder effectuating turning and steering of the watercraft.

9. The watercraft of claim 1, further comprising an articulating trim arm operatively connected to an elevator control supported by the hydro-wing, the articulating trim arm remaining in contact with the water during the third stage of operation when the hydro-wing is traveling spaced above the water.

10. A watercraft for three-stage operation, in a first stage the watercraft riding in the water as a boat, in a second stage the watercraft riding on the surface of the water, and in a third stage the watercraft being in contact with the water while traveling in ground effect, the watercraft comprising:
a hydro-wing including a combined hull and wings, the hull constructed and arranged to support a cabin, and the wings constructed and arranged to provide lift, a bottom surface of the combined hull and wings forming a substantially continuous ground effect surface of the hydro-wing;
at least a single hydrofoil supported by the hydro-wing and constructed and arranged to contact the water in stage two;
a pair of outboard hydro-floats supported on the bottom surface of the hydro-wing on a port and a starboard side thereof;
a pair of air rudders supported by the hydro-wing constructed and arranged to effectuate turning during the second stage of operation and the third stage of operation;
at least one water rudder supported by the hull constructed and arranged to effectuate turning when the rudder is in the water; and
at least one pivotally mounted air propeller, pivotal between a first position substantially parallel to a horizontal plane of travel of the watercraft and second position substantially vertical to a horizontal plane of travel of the watercraft.

11. The watercraft of claim 10, wherein in the first stage of operation of the watercraft riding in the water, the at least one pivotally mounted air propeller is in the first position to provide lift.

12. The watercraft of claim 10, wherein in the third stage of operation of the watercraft travelling in ground effect, the at least one pivotally mounted air propeller is in the second position to provide forward thrust.

13. The watercraft of claim 10, wherein in the second stage of operation of the watercraft riding on the surface of the water, the at least one pivotally mounted air propeller is in a mid-way position between the first position and the second position to provide combined lift and forward thrust.

14. The watercraft of claim 10, further comprising an articulating trim arm operatively connected to an elevator control supported by the hydro-wing, the articulating trim arm remaining in contact with the water during the third stage of operation when the hydro-wing is traveling spaced above the water.

15. The watercraft of claim 10, wherein the hydro-floats each include one or more concavities constructed and arranged to create a positive turbulence as water passes by the concavity and turns in a vortex to create additional lift of the hydro-wing.

16. The watercraft of claim 10, wherein the at least a single hydrofoil comprises a forward hydrofoil supported on the forward portion of the hydro-wing, and an aft hydrofoil supported on the rear portion of the hydro-wing, the hydrofoils being constructed and arranged to provide lift to transition the watercraft from stage one to stage two.

17. The watercraft of claim 16, wherein the forward hydrofoil and the aft hydrofoil are movable between a first, in-use position where the forward and aft hydrofoils engage the water and a second, stored position where the forward and aft hydrofoils are positioned under and adjacent the bottom surface of the hydro-wing hull.

18. A watercraft for three-stage operation, in a first stage the watercraft riding in the water as a boat, in a second stage the watercraft riding on the surface of the water, and in a third stage the watercraft being in contact with the water while traveling in ground effect, the watercraft comprising:
a hydro-wing including a combined hull and wings, the hull constructed and arranged to support a cabin, and the wings constructed and arranged to provide lift;
at least a single hydrofoil supported by the hydro-wing;
a pair of outboard hydro-floats supported on the bottom surface of the hydro-wing on a port and a starboard side thereof;
at least one pivotally mounted air propeller, pivotal between a first position substantially parallel to a horizontal plane of travel of the watercraft and second position substantially vertical to a horizontal plane of travel of the watercraft; and
wherein in the first stage of operation of the watercraft riding in the water, the at least one pivotally mounted air propeller is in the first position to provide lift, in the third stage of operation of the watercraft travelling in ground effect, the at least one pivotally mounted air propeller is in the second position to provide forward thrust, and in the second stage of operation of the watercraft riding on the surface of the water, the at least one pivotally mounted air propeller is in a mid-way position between the first position and the second position to provide a combination of both lift and forward thrust as may be desired.

19. The watercraft of claim 18, further comprising an articulating trim arm operatively connected to an elevator control supported by the hydro-wing, the articulating trim arm remaining in contact with the water during the third stage of operation when the hydro-wing is traveling spaced above the water.

20. The watercraft of claim 18, wherein each pivotally mounted air propeller is operatively connected to a corresponding engine pod, the pivotally mounted air propellers and corresponding engine pods being pivotally mounted to a horizontal support member supported by the hydro-wing and lockable in any incremental position from about zero to ninety degrees of the propeller relative to the plane of travel of the watercraft.

* * * * *